(12) United States Patent
Yang et al.

(10) Patent No.: US 7,098,894 B2
(45) Date of Patent: Aug. 29, 2006

(54) PEN TYPE OPTICAL MOUSE DEVICE AND METHOD OF CONTROLLING THE SAME

(75) Inventors: Hong-Young Yang, Bucheon-si (KR); Seung-Gol Lee, Incheon (KR)

(73) Assignee: Finger System Inc., Seoul (KR)

( * ) Notice: Subject to any disclaimer, the term of this patent is extended or adjusted under 35 U.S.C. 154(b) by 414 days.

(21) Appl. No.: 10/120,160

(22) Filed: Apr. 11, 2002

(65) Prior Publication Data

US 2003/0112220 A1 Jun. 19, 2003

(30) Foreign Application Priority Data

Dec. 15, 2001 (WO) .................... PCT/KR01/02182

(51) Int. Cl.
*G09G 5/08* (2006.01)
(52) U.S. Cl. .................... 345/166; 345/179; 178/19.05
(58) Field of Classification Search ................ 345/179, 345/157, 145, 156, 180, 166, 163, 165, 164, 345/175, 183; 178/18.01, 18.02, 19.04, 19.05, 178/18.09; 382/314, 321
See application file for complete search history.

(56) References Cited

U.S. PATENT DOCUMENTS

| 5,444,193 | A | * | 8/1995 | Satoh et al. | ............. | 178/19.05 |
| 5,714,978 | A | * | 2/1998 | Yamanaka et al. | .......... | 345/157 |
| 5,780,846 | A | * | 7/1998 | Angilella et al. | ...... | 250/227.21 |
| 5,933,135 | A | * | 8/1999 | Martin | ........................ | 345/179 |
| 6,622,276 | B1 | * | 9/2003 | Nagasaki et al. | ............ | 714/752 |

* cited by examiner

*Primary Examiner*—Richard Hjerpe
*Assistant Examiner*—Abbas Abdulselam
(74) *Attorney, Agent, or Firm*—McKenna Long & Aldridge LLP

(57) ABSTRACT

A pen-type optical mouse device indicates a cursor position or inputs writing or a movement of the pen-type optical mouse. An aspect of the pen-type optical mouse is to calculate coordinate values of the mouse device in accordance with a movement of the pen-type optical mouse device. The pen-type optical device includes an image sensor on a side of the interior of a main body of pen-type the mouse device, thereby allowing the pen-type optical mouse device to be slim and easy to hold.

8 Claims, 19 Drawing Sheets

Reference object surface (a) Case where pen-type optical mouse device has been grasped normally (b) Case where pen-type optical mouse device has been grasped abnormally

PEN TYPE OPTICAL MOUSE DEVICE AND METHOD OF CONTROLLING THE SAME

BACKGROUND OF THE INVENTION

1. Field of the Invention

The present invention relates to a pen-type optical mouse device and a method of controlling the same, and more particularly, to a pen-type optical mouse device and a method of controlling the same wherein a light guide causes light emitted from an illuminator to be incident on a surface at a predetermined angle, and a path of the light reflected from the surface is changed so that an image of the surface is imaged upon an image sensor, thereby allowing to write letters or draw a figure through a natural writing action.

2. Description of the Prior Art

A conventional mouse is a computer peripheral device which points a position by using a cursor displayed on a display device of a computer system and comprises a ball for allowing the change of a position and function buttons.

However, in such a conventional ball-type mouse, since the ball is not smoothly rotated on a slick surface, there is a limitation on a usage place and thus a mouse pad is required in order to ensure the smooth rotation of the ball. In addition, even if the ball of the mouse is rotated on the mouse pad, coordinate axes changed in accordance with the rotation of the ball do not exactly correspond thereto. Thus, there is a problem in that the cursor cannot be smoothly moved on the screen of the display device.

Further, in a case where a letter is inputted or a precision work is carried out using the ball-type mouse, a user has to operate a click button provided at the leading end of the mouse while holding and moving the mouse. However, in such a case, there are problems in that it is troublesome to perform such an operation of moving the mouse and thus the rapidity and accuracy of measurement of the coordinates are degraded. Particularly, there is a disadvantage in that since the shape of the mouse is different from those of general writing instruments, natural writing and drawing cannot be performed with the mouse. In addition, since the ball-type mouse essentially utilizes rotation of the ball, dust or the like may be collected between the ball and a device for sensing the rotation of the ball. Thus, there are disadvantages in that the durability of the mouse may be deteriorated and the interior of the mouse should be periodically cleaned.

Moreover, as for optical mouse devices for a computer which employ a method of detecting coordinates by using light, an optical mouse with an optical sensor and a pad combined, and an optical mouse employing a CMOS sensor have been used. The optical mouse with the optical sensor and the pad is constructed such that a coordinate detecting means including a light emitting element and a light receiving element, and a cross line pattern is inscribed on a mouse pad. In such a case, there is a problem in that since the optical mouse inevitably requires an exclusive pad, use of the mouse is limited.

Meanwhile, in case of the recently developed optical mouse employing the CMOS sensor, there are advantages in that an additional pad is not required contrary to a conventional optical mouse device, and its durability is improved since any moving parts are not employed therein. The principle of such an optical mouse is specifically disclosed in U.S. Pat. No. 6,233,368 B1 entitled "CMOS digital optical navigation chip" issued on May 15, 2001. In this patent, a work surface or sheet surface disposed directly below the optical mouse is illuminated with an illuminator (illuminating light source and its system) contained in the optical mouse; an imaging system contained therein images an arbitrary pattern or feature on the work or sheet surface on the plane of the CMOS sensor; and a processing unit detects a direction and the degree of movement of the mouse from variations in image information with time. In addition to such an optical mouse, U.S. Pat. No. 4,794,384 entitled "optical translator device" issued on Dec. 27, 1988 discloses the constitution in which when a work surface is illuminated with partially coherent light from a light source, a detector array detects changes in a speckle pattern reflected by the work surface so that movement of the mouse can be detected.

Such constitution has an advantage in that there is no limitation on usage environments thereof. However, since the shape of the mouse is different from those of general writing instruments, the movement of the mouse is performed in a state where the entire mouse is held in a user's hand and so it is difficult to achieve accurate coordinate movement. As a result, there is a problem in that it is not easy to perform a graphic operation or to write the user's signature using the mouse.

A pen-type mouse for implementing accurate cursor control when performing a delicate graphic operation or writing the user's signature has been developed. An example of such a pen-type mouse is disclosed in U.S. Pat. No. 6,151,015 (hereinafter, referred to as "'015 patent") entitled "pen like computer pointing device" issued on Nov. 21, 2000. As shown in FIG. 1, the pointing device includes a cylindrical body 102, an illumination source 104, a lens 110, an optical motion sensor 108, a switch 106, communications links 116, 118, and buttons 112, 114. The illumination source 104 emits light, and the lens 110 allows reflected light, which is generated when the light emitted from the illumination source 104 is reflected off a work surface, to be imaged. Then, when an image of the work surface imaged through the lens 110 is captured with the optical motion sensor 108, a direction and amount of movement of the pointing device are obtained from variations in the image due to motion of the pointing device, and they are then transmitted to a computer through the communications links 116, 118.

However, the optical pointing device of the '015 patent has the following three disadvantages in performing a delicate graphic operation or smoothly writing one's signature.

First, there is a disadvantage in that it is difficult to hold the pointing device in one's hand due to large diameter thereof. Referring to FIG. 1, the optical motion sensor 108 for capturing the image of the work surface is disposed in a direction perpendicular to a central axis of the pointing device. Here, since the optical motion sensor 108, which is a kind of IC chip, has a standard size of a semiconductor chip, the dimension thereof in the (horizontal) direction perpendicular to the central axis of the pointing device is relatively longer than that in a (vertical) direction parallel to the central axis. Therefore, since the installation of the optical motion sensor 108 in the manner shown in FIG. 1 results in enlargement of the diameter of the pointing device, it is difficult to use the pointing device while holding it in one's hand.

The second disadvantage is that the motion of the pointing device cannot be accurately detected on a particular work surface. Referring to FIG. 1 again, since the optical pointing device of the '015 patent does not have a means for transferring the light emitted from the illumination source 104 to the work surface at a small angle, an angle Θ of the light from the illumination source 104 incident on the work surface may be increased, as shown in FIG. 2. Accordingly, if the work surface illuminated with the illumination source 104 does not have any patterns thereon or has the same color throughout the entire surface, there is a problem in that the motion of the mouse cannot be detected. FIG. 2 is a magnified view showing a work surface 21, such as that of copying paper, having a uniform color and no patterns. When viewing the surface with the naked eye under normal illumination, the irregularities of such a surface cannot be recognized. However, a general work surface actually has fine irregularities such as those of the work surface 21 shown in FIG. 2. In FIG. 2, if the angle Θ of the light that is irradiated from the illumination source 104 onto the work surface is over 40 degrees, the light is irradiated onto both left and right side slant surfaces 24, 23 of a convex portion. Thus, the left and right side slant surfaces 24, 23 of the convex portion cannot be discriminated therebetween in the image of the work surface imaged through the lens.

The third disadvantage is that when the pointing device is spaced apart from the work surface, the position of the cursor cannot be chased. Referring to FIG. 3, upon input of letters or figures, a writing operation with a pen is generally comprised of a combination of a pen-down action by which the pen comes into contact with a work surface and is then moved thereon, and a pen-up action by which the pen is spaced apart from the work surface and is then moved. For example, as shown in FIG. 3, when writing an alphabetic capital letter "X," the writing action is comprised of a step of writing "/" through the pen-down action (step S1), a step of moving the pen through the pen-up action (step S2), and a step of writing "\" through the pen-down action (step S3). In general, in the pen-up action, the distance to be spaced apart from the surface is about 3 mm or less.

On the contrary, when it is intended to write the letter "X" by using the optical pointing device of the '015 patent, the pointing device comes into contact with the surface, a set button thereof is clicked, and then "/" is continuously written without a break (step S1). Subsequently, the set button is released, and the pointing device is moved to a proper position with being kept in contact with the surface (step S2). Then, the set button is clicked again, and "\" is written with the pointing device being kept in contact with the surface (step S3). Here, even when the pointing device is merely moved without inputting a letter (step S2), the pointing device should be in contact with the surface in order to chase coordinates thereof. If the pointing device is spaced apart from the surface, the distance between the surface 21 and the lens 110 is increased, so that the lens 110, which is designed to be properly operated under the condition that the pointing device is in contact with the surface 21, cannot cause the light to be accurately imaged on the optical motion sensor 108. Correct measurement of the coordinates cannot therefore be made in the state of the pen-up action, so that it is difficult to input letters or figures through a smooth or natural writing action.

The aforementioned writing action may be smoothly or naturally made only when the state where the mouse device is in contact with the surface and the state where the mouse device is not in contact with the surface are successively connected with each other. With such a conventional mouse device, since a letter or figure should be written or drawn only in a state where the mouse device is always in contact with the surface, it is difficult to smoothly perform the writing action and to correctly input a desired letter. Further, since almost all works are processed through the Internet at the present time, a case where a user should write his/her comment or signature on a document displayed on a monitor often takes place. However, it is very difficult to input a unique style of handwriting such as a signature with the conventional mouse devices. Accordingly, it is nearly impossible that the user realizes his/her signature on the monitor.

Consequently, in order to achieve the smooth input of the letter or figure, there is a need for a means capable of correctly measuring values of positions of the mouse device so that the coordinates thereof can be continuously chased irrespective of the state where the mouse device is in contact with the surface or not.

Meanwhile, even if the problems in the conventional pen-type optical mouse device required for a delicate graphic operation or a smooth writing operation may be solved, two other critical problems is expected. The pen-type optical mouse device is actually used in a slightly slanted state with respect to the work surface rather than in an upright state. Thus, the central axis (or longitudinal axis) of the pen-type optical mouse device is inclined at a certain inclination angle with respect to the direction (hereinafter, referred to as "z-axis") normal to the work surface. As a result, the "y-axis" of the pen-type optical mouse device is influenced by the inclination angle, whereas the "x-axis" thereof is not influenced by the inclination angle. That is, a magnification in each of the "x-" and "y-" axis directions of the pen-type optical mouse device becomes different from each other. For example, if the user draws a circle with the pen-type optical mouse device, information on the motion of the mouse device is recognized as an ellipse having different ratios of width and height rather than the circle. Here, the aforementioned "x-," "y-," and "z-" axes are defined as follows. The "z-axis" is defined as the direction normal to the work surface or sheet surface, and the work or sheet surface, i.e. a plane normal to the "z-axis," is defined as the "x-y plane." At this time, the "y-axis" is defined as a straight line or direction that is included in a plane formed by both the normal ("z-axis") and the central axis of the pen-type optical mouse device and is also placed in the "x-y plane." The "x-axis" is defined as another direction that is perpendicular to the "y-axis" and simultaneously placed in the "x-y plane."

In addition, the optical motion sensor 108 for capturing the image of the work surface utilizes its horizontal and vertical directions as reference directions for the motion of the mouse device. Since the pen-type optical mouse device generally takes the shape of a cylinder, the optical motion sensor disposed within the mouse device may be rotated from a reference angle in accordance with a posture in which the user grasps the mouse device. Accordingly, if the user grasps the mouse device in an unsuitable posture, a direction in which the mouse device is horizontally moved is not parallel to the horizontal direction of the optical motion sensor 108 contained in the mouse device. Thus, there is a problem in that the moving direction of the mouse device sensed by the optical motion sensor 108 is rotated at a certain angle from the actual moving direction thereof, thereby producing a distortion of the moving direction thereof.

SUMMARY OF THE INVENTION

The present invention is conceived to solve the problems as mentioned above. A primary object of the present invention is to provide a pen-type optical mouse device wherein an image sensor is installed on a side of the interior of a main body of the pen-type optical mouse device, so that the mouse device is slim and thus can be easily grasped with a hand.

A second object of the present invention is to provide a pen-type optical mouse device wherein light emitted from an illumination unit is guided to be irradiated onto a work surface at a small angle therewith so that movement of the mouse device can be correctly sensed regardless of the condition of the work surface.

A third object of the present invention is to provide a pen-type optical mouse device and a method of controlling the same, wherein it is possible to discriminately sense conditions that the mouse device is moved with it being kept in contact with a work surface and without contact with the work surface, a writing command is automatically recognized depending on sensed contact pressure, and a continuous chase of coordinates of the mouse device is performed regardless of whether it is in contact with the work surface or not, so that either writing a letter or drawing a figure can be conveniently performed in the same way as handwriting with a pen.

A fourth object of the present invention is to provide a pen-type optical mouse device and a method of controlling the same, wherein trapezoidal distortion is minimized and distortion of coordinate values of the mouse device according to a grasping posture, in which a user grasps the mouse device, is compensated so that the accurate movement of the cursor and the exact writing input can be obtained irrespective of the posture in which the user grasps the mouse device.

In order to achieve the first object, a path of an imaging system is folded in the right angle by means of an optical path converter so that the image sensor is installed on a side of the interior of the main body of the pen-type optical mouse device according to the present invention.

In order to achieve the second object, according to the present invention, light emitted from an illumination unit is guided by means of a light guide so that the light is irradiated onto the work surface at a small angle therewith.

In order to achieve the third object, according to the present invention, a writing command is automatically recognized by sensing contact pressure of the mouse device through a contact sensing means, and a lens having a long focal length or a telecentric system is used to lengthen a depth of focus of an optical system, so that the coordinates of the mouse device are measured regardless of whether the mouse device is in contact with the work surface or not.

In order to achieve the fourth object, according to the present invention, the trapezoidal distortion is minimized by adjusting an arrangement angle(s) of either or both the optical path converter or/and the image sensor or by using the telecentric system.

To further achieve the fourth object, according to the present invention, the anisotropy of magnification in sensing the coordinate values of the mouse device can be corrected on the basis of a correction factor that is calculated according to a writing habit inputted by a user, or on the basis of an inclination of a central axis of the mouse device which is sensed by an inclination sensor.

To conclusively achieve the fourth object, according to the present invention, the coordinate values of the mouse device is corrected on the basis of a rotation angle of the mouse device which is calculated with respect to a reference angle thereof according to the writing habit inputted by the user, or on the basis of the rotation angle of the mouse device sensed by a rotation angle sensor.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE INVENTION

Hereinafter, preferred embodiments of the present invention will be described in detail with reference to the accompanying drawings.

Figure 4:
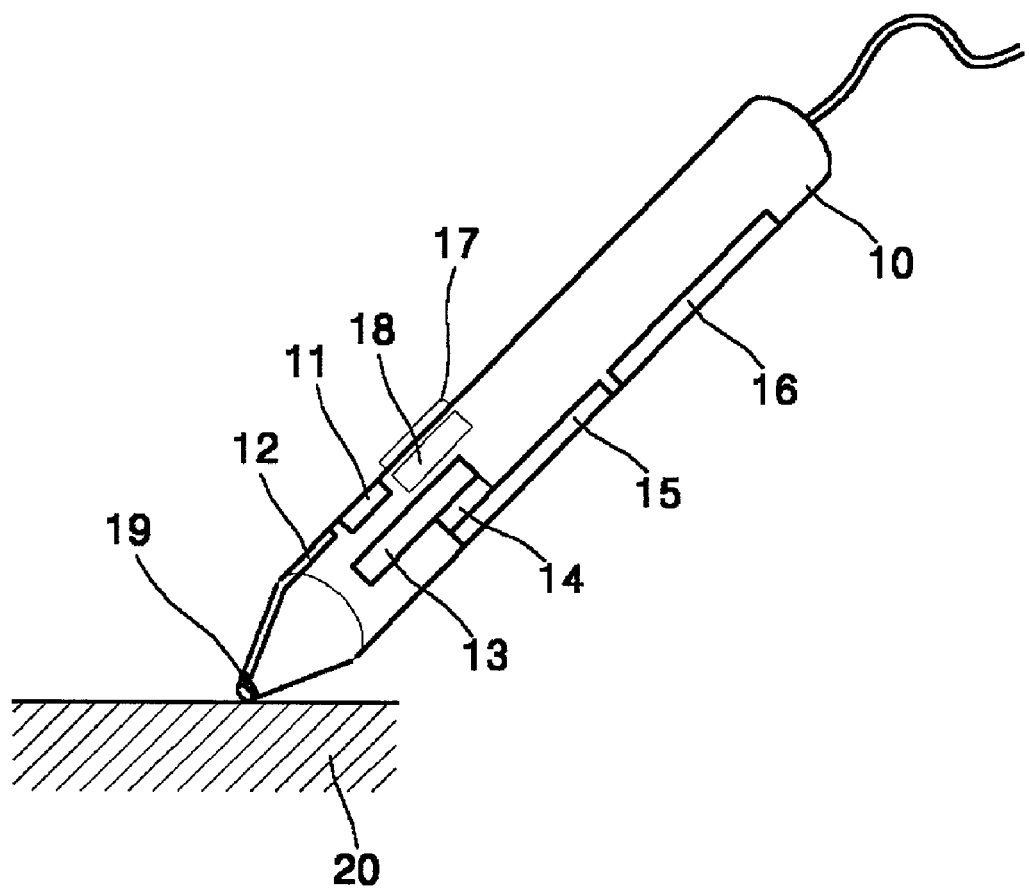
FIG. 4 is a perspective view of a pen-type optical mouse device according to the present invention.

FIG. 4 is a perspective view of a pen-type optical mouse device according to the present invention.

The pen-type optical mouse device shown in FIG. 4 includes a main body 10 of the mouse device, an illumination unit 11, an imaging system 13, an image sensor 14, a control means 15, a transmitting means 16, a set button 17, a wheel switch 18, and a contact sensing means 19.

The main body 10 of the mouse device takes the form of a pen with a circular or elliptical cross-section such that a user can conveniently grasp it. Preferably, the main body 10 includes a plurality of grip portions (not shown) by which a user can hold it between his/her fingers.

The contact sensing means 19 detects contact pressure generated when a leading end of the main body 10 comes into contact with an arbitrary work surface 20 such as a desk surface, in the same way as, for example, a pressure sensor. The illumination unit 11 emits light when the contact sensing means 19 disposed at the leading end of the main body 10 detects pressure, i.e. by means of a signal indicating that the pen-type optical mouse device comes into contact with the work surface. Of course, the illumination unit 11 may be operated by using the set button 17 or the wheel switch 18. In addition, the control means 15 may cause the illumination unit 11 to emit faint light when the mouse device is not in use and to emit a normal luminosity when the contact sensing means 19 detects the pressure or the image sensor 14 detects any variations in an image captured thereon upon use of the mouse device.

The light guide 12 guides the light emitted from the illumination unit 11 so as to be irradiated onto the work surface 20 at a certain angle therewith. However, the light guide 12 maybe omitted, if necessary. For example, it is possible to implement a pen-type optical mouse device without the light guide 12 if the pen-type optical mouse device is used on an arbitrary work surface such as a desk surface.

Reflected light generated when the light irradiated through the light guide 12 is reflected by the work surface is imaged by the imaging system 13 which, in turn, outputs it to the image sensor 14.

The image sensor 14 receives the light imaged by the imaging system 13 and converts it into electrical signals, which are then transmitted to the control means 15. The control means 15 performs amplifying, filtering and photo-electric conversion in accordance with the electrical signals converted by the image sensor 14, and calculates coordinate values of the cursor to be displayed on a monitor.

The transmitting means 16 provides the coordinate values calculated by the control means 15 and the status signals set by the set buttons and sensed by sensors to a control means disposed within a computer through a mouse port. Of course, the transmitting means 16 can support both wire and wireless transmissions. The set button 17 and the wheel switch 18 are function buttons for performing predetermined operations through the control means 15.

Preferably, the pen-type optical mouse device further includes an inclination sensor (not shown) for sensing an inclination of a central axis of the mouse device with respect to the direction normal to the work surface in order to correct the anisotropy of magnification of the mouse device due to the inclination thereof, and a rotation angle sensor (not shown) for sensing a rotation angle of the mouse device with respect to a reference angle thereof in order to correct distortion due to an individual difference in a grasping posture of the mouse device. Here, the inclination sensor may be comprised of sensors for detecting the inclination of the central axis of the pen-type optical mouse device by using gravity acting on a massive piece contained in the main body, movement of a fluid filled in a closed space, variations in a capacitance or an electric current, or an encoder. A sensor employing micro-electromechanical system (MEMS) technology that is highlighted at the present time may also be used as the inclination sensor.

Further, the pen-type mouse device is preferably used as a portable standalone-type input device separately from a computer. To this end, the mouse device further includes a memory (not shown) for storing movement traces of the mouse device when carried with a user. Therefore, when the user takes notes of important contents on a paper or memo pad by using the pen-type optical mouse device that is carried with the user, the movement traces of the mouse device are stored in the form of vector images or bitmap images into its internal memory. The information stored as such can be confirmed by using specific application software when the mouse device is connected with a computer via wired or wireless connection.

Figure 5:
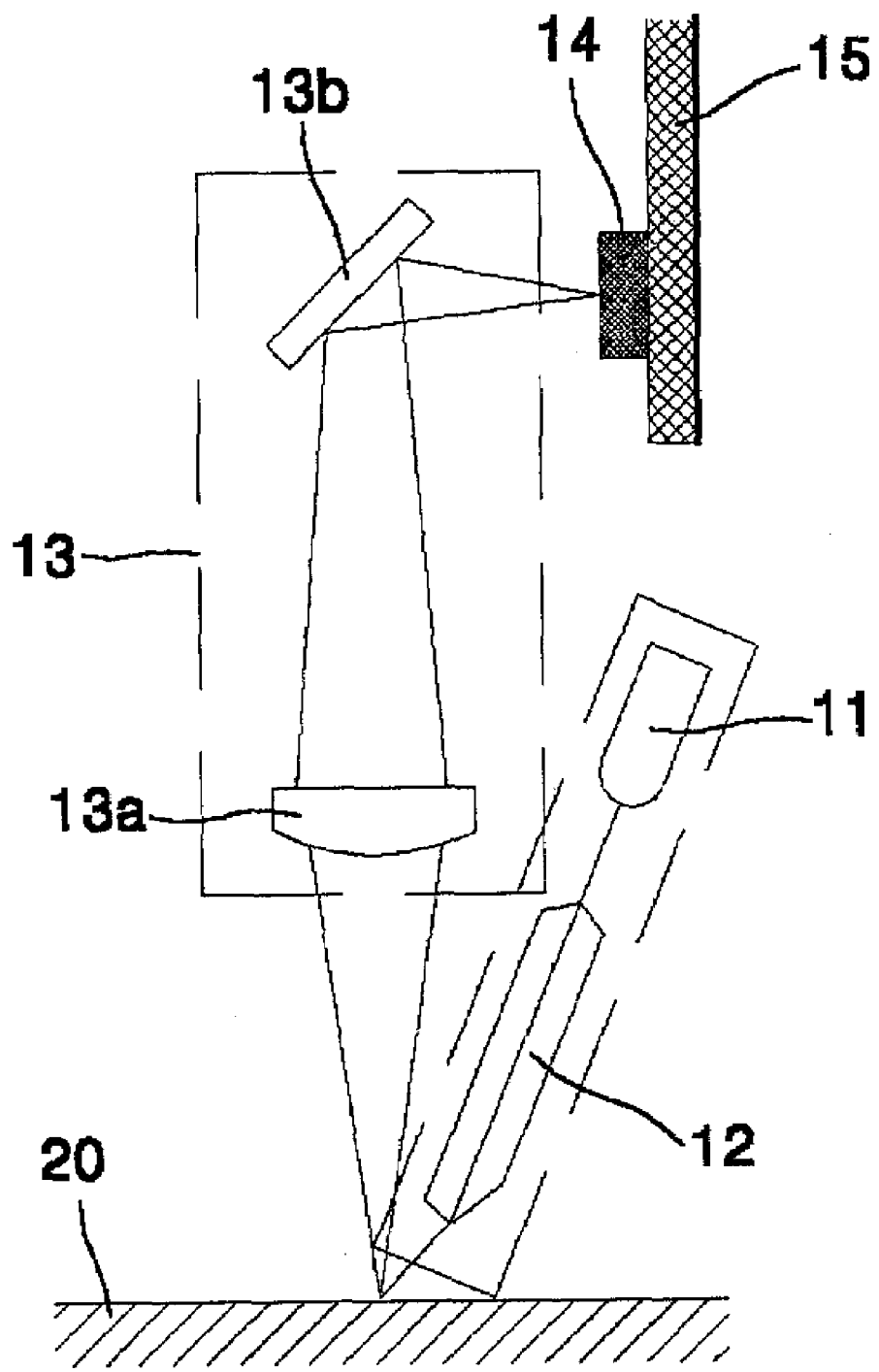
FIG. 5 is a view showing an example of the inner constitution of the pen-type optical mouse device according to the present invention.

FIG. 5 is a view showing an example of the inner constitution of the pen-type optical mouse device according to the present invention In FIG. 5, like reference numerals are denoted for indicating the same components as FIG. 4.

Since the operations of the illumination unit 11, the light guide 12, the imaging system 13, the image sensor 14 and the control means 15 are identical with those described with reference to FIG. 4, the detailed description thereof will be omitted.

The imaging system 13 includes an imaging lens 13a, and a reflector or a right prism 13b that serves as an optical path converter. The imaging lens 13a images the light which is emitted from the illumination unit 11, irradiated through the light guide 12 onto and then reflected by the work surface 20.

The reflector or right prism 13b is installed in a path of the light, which has passed through the imaging lens 13a, to change the path of the light so that the light is exactly imaged on the image sensor 14.

Figure 6:
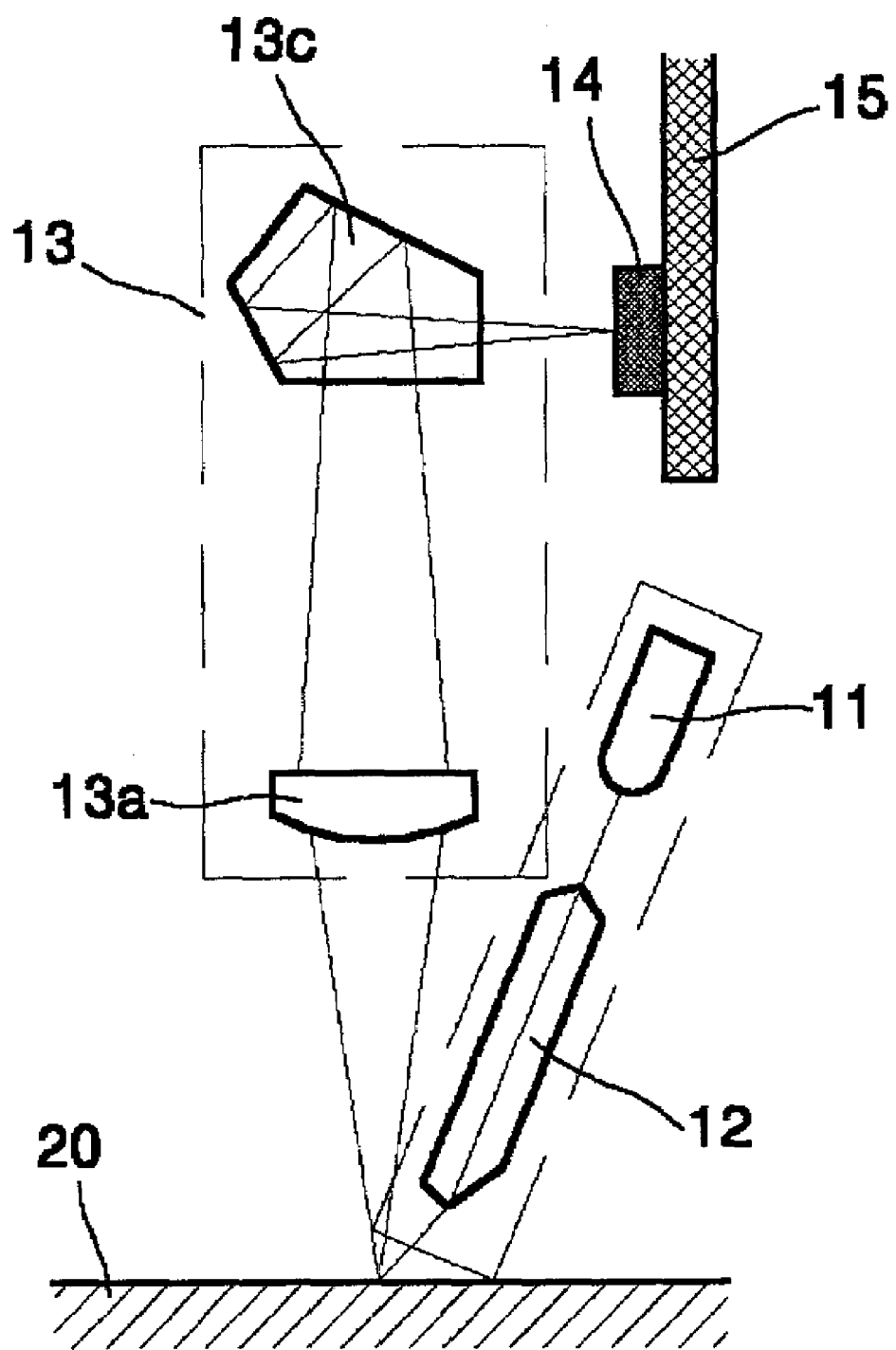
FIG. 6 is a view showing another example of the inner constitution of the pen-type optical mouse device according to the present invention.

FIG. 6 is a view showing another example of the inner constitution of the pen-type optical mouse device according to the present invention.

The constitution of FIG. 6 is similar to that of FIG. 5 except for the structure of the imaging system. That is, the constitution of FIG. 6 is provided with a pentaprism 13c instead of the reflector or right prism 13b, which serves as the optical path converter.

The pentaprism 13c is installed in a path of the light, which has passed through the imaging lens 13a, to change the path of the light by 90 degrees so that the light is exactly imaged on the image sensor 14, in the same manner as the reflector or right prism.

Moreover, in the case where the pentaprism 13c is used as the optical path converter, the direction in which the mouse device is actually moved is consistent with the direction of the cursor displayed on a monitor.

Figure 7:
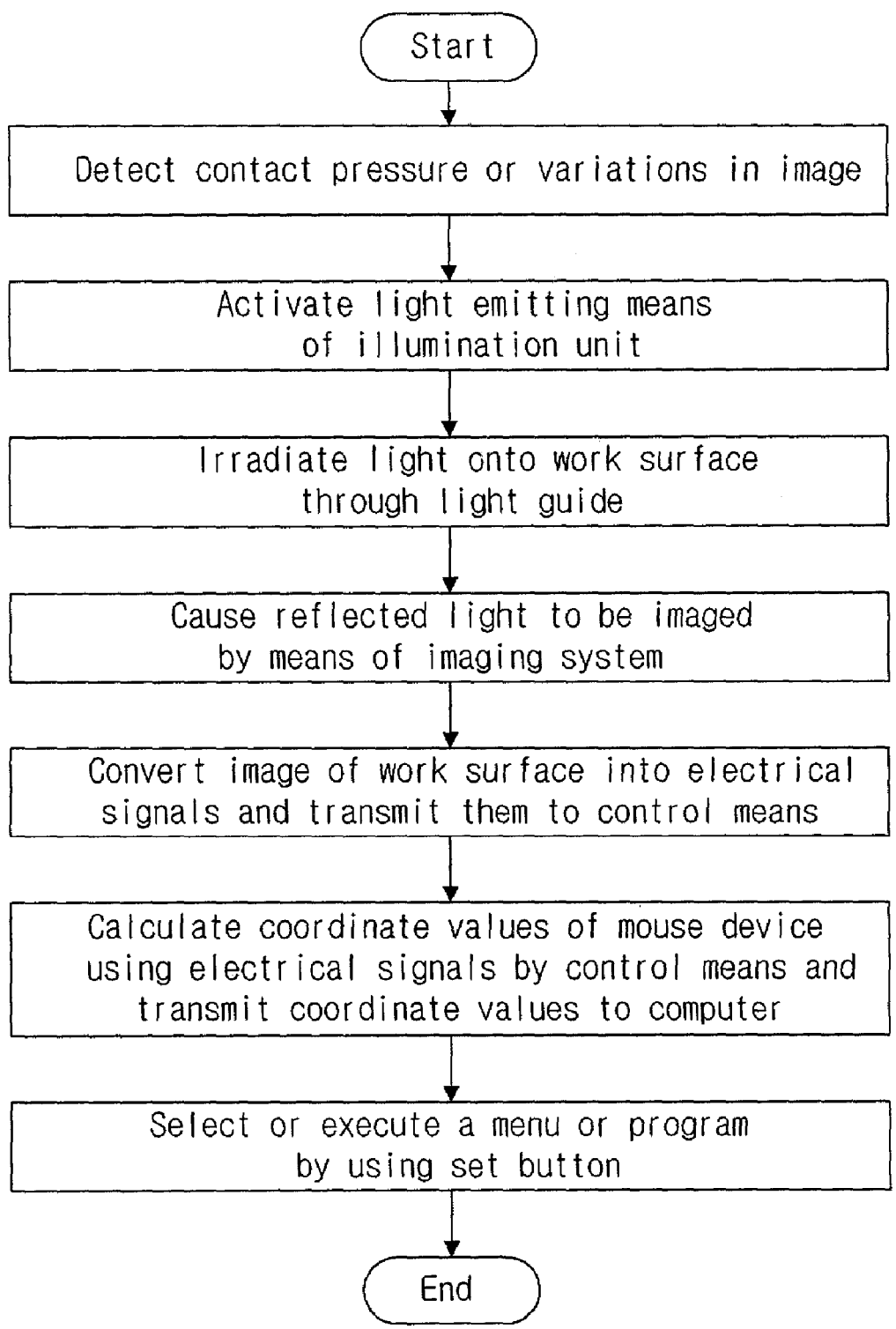
FIG. 7 is a flowchart for explaining the operation of the pen-type optical mouse device according to the present invention.

FIG. 7 is a flowchart for explaining the operation of the pen-type optical mouse device according to the present invention.

In FIG. 7, when a user grasps the main body 10 with his/her hand as if he/she holds a real pen, and then moves it into contact with the work surface 20, the contact sensing means 19 disposed at the leading end of the pen-type optical mouse device detects contact pressure. At this time, the illumination unit 11 emits light in response to signals indicating that the mouse device is in contact with the work surface.

Figure 8:
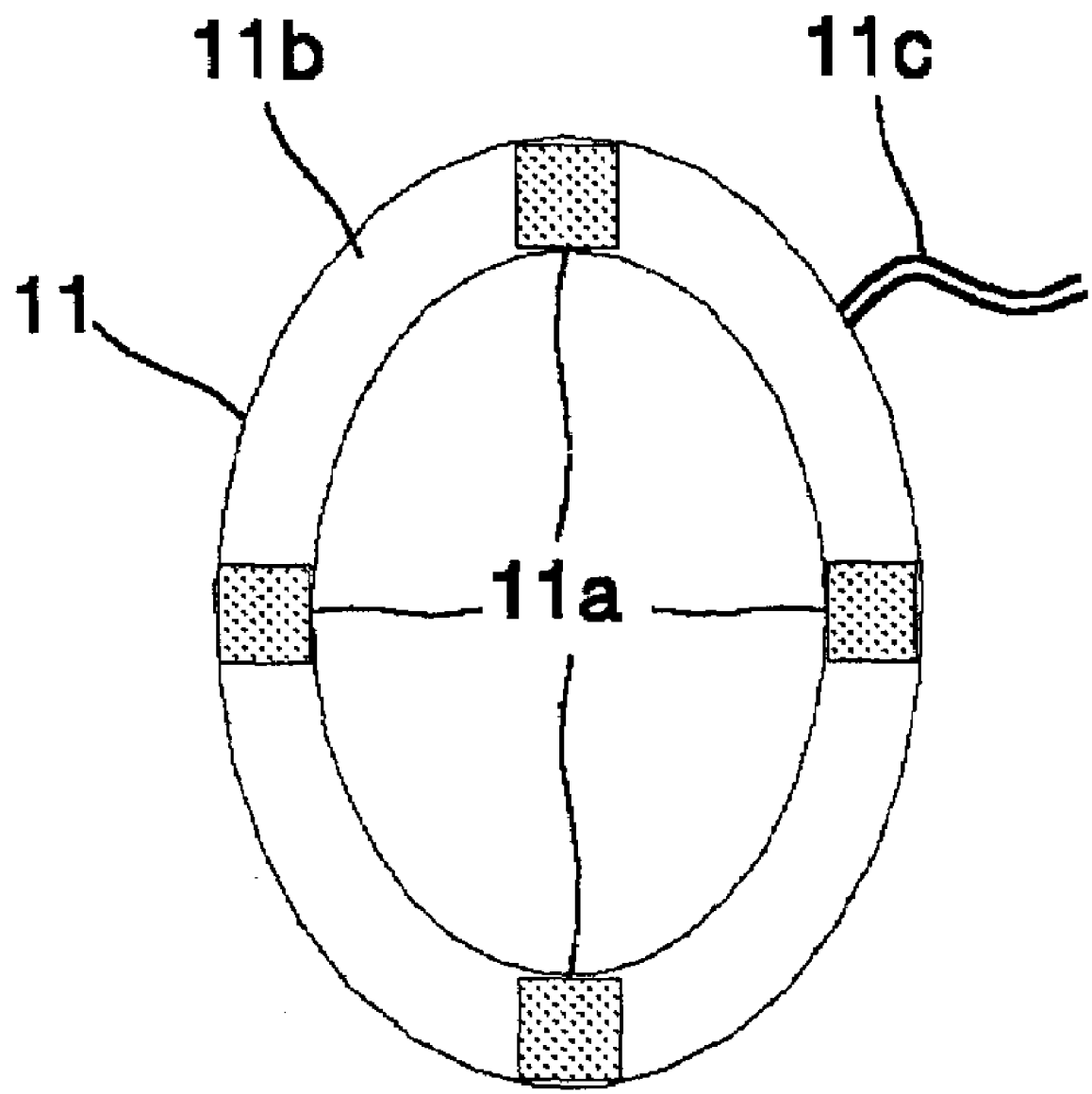
FIG. 8 is a view showing an example of an illumination unit of the pen-type optical mouse device according to the present invention.

An example of the illumination unit 11 is shown in FIG. 8. In the figure, the illumination unit 11 includes a circular or elliptical printed circuit board (PCB) 11b, a plurality of light emitting means 11a mounted at a predetermined interval on the PCB 11b, and a power wire 11c for supplying electric power to the PCB 11b. Here, the plurality of light emitting means 11a are employed in order to increase the amount of the reflected light captured on the image sensor 14 through the imaging system 13 by increasing the amount of the light irradiated onto the work surface even while using a compact and low luminance light emitting means.

On the other hand, the light emitting means 11a mounted on the PCB 11b may be operated in various manners. First, when the mouse device is not in use, the control means 15 causes the light emitting means 11a to emit faint light therefrom. When the set button 17 or wheel switch 18 that acts as a function button is manipulated, the light emitting means 11a can be normally operated. Alternatively, although the light emitting means 11a are operated to emit faint light when the mouse device is not in use, the control means 15 may cause the light emitting means 11a to emit the normal luminosity when the contact sensing means 19 detects the contact pressure or the image sensor 14 detects any variations in the image captured thereon. Here, since the light emitting means 11a emit the faint light even when the mouse device is not in use, the variations in the image captured on the image sensor 14 are detected if the mouse device is moved to be used, so that the mouse device can be quickly converted into the normal operating state.

In addition, supply or turning off of the electric power to the light emitting means 11a may be performed by signals from the contact sensing means 19 so that the luminosity of the light emitting means can be adjusted. In such a way, since the mouse device is not operated when it is not in use, a electric power can be saved.

As described above, when the contact sensing means 19 detects the contact pressure or the image sensor 14 detects the variations in the image captured thereon, the illumination unit 11 as shown in FIG. 5 or 6 emits the light.

Then, the light emitted from the light emitting means 11a of the illumination unit 11 is irradiated onto the work surface through the light guide 12.

Figure 9:
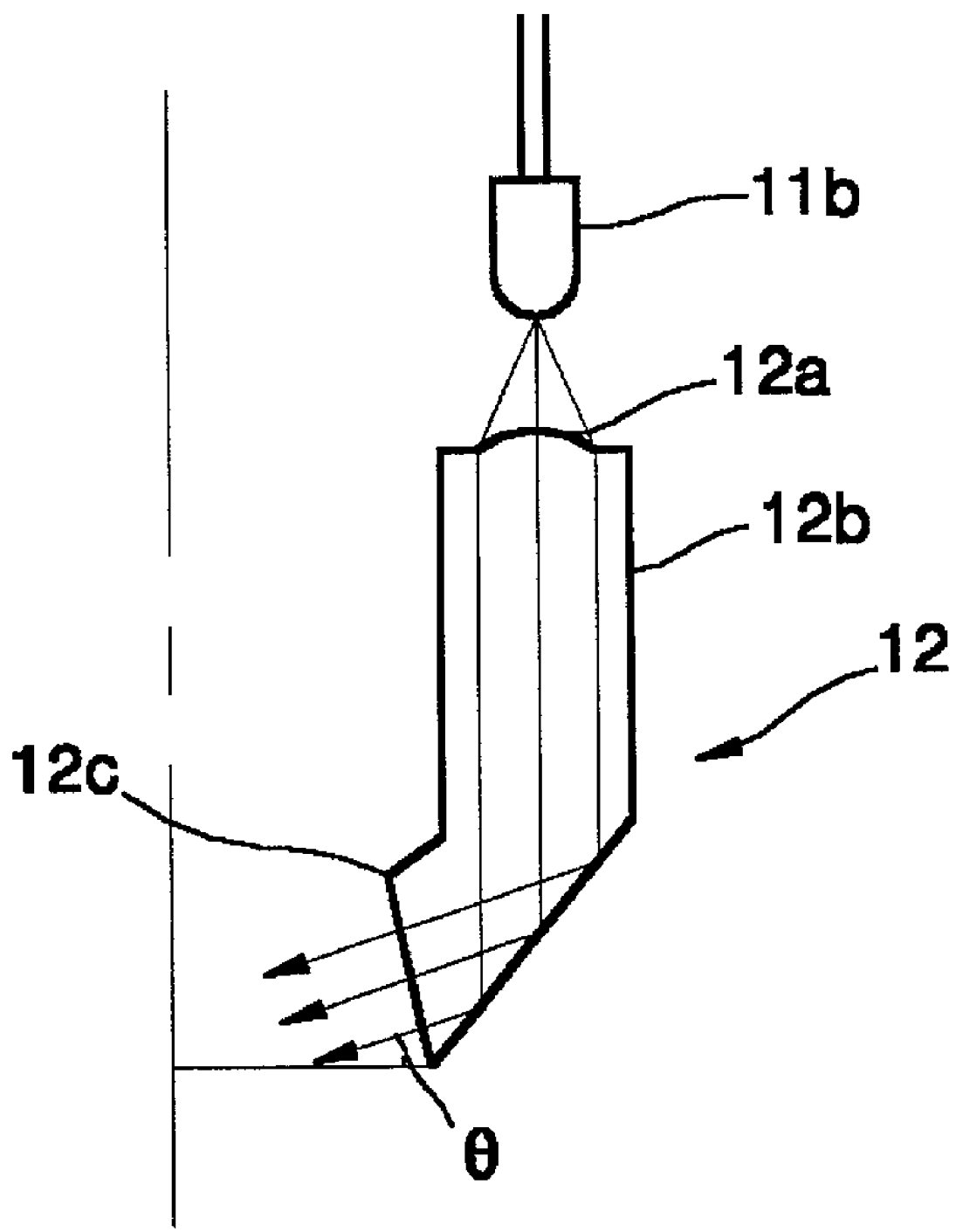
FIG. 9 is a view showing an example of a light guide of the pen-type optical mouse device according to the present invention.

FIG. 9 is a view showing an example of the light guide of the pen-type optical mouse device according to the present invention. Referring to FIG. 9, the light guide 12 includes a convex lens 12a, a light waveguide 12b, and a concave lens 12c. The convex lens 12a collimates light, which has been emitted from the light emitting means 11a while diverging at a certain angle (20 degrees or more in some cases, or 140 degrees or more in the other cases), in the form of parallel rays. The light converted into the parallel rays by the convex lens 12a passes through the light waveguide 12b of the light guide 12. At this time, in order to prevent the light from leaking out from the light guide 12, all surfaces of the light waveguide 12b meets total reflection requirements for the proceeding light. Further, a slant reflecting-surface is installed in the light waveguide 12b so that the light is irradiated onto the work surface at a small angle therewith, as shown in FIG. 9. The light proceeding through the light waveguide 12b is irradiated onto the work surface through a final stage of the light guide 12, i.e. the concave lens 12c. Meanwhile, the concave lens 12c causes the light passing through the light guide 12 to be diffused in some degree so that an irradiated area having a desired size is produced and the light is uniformly irradiated onto the work surface.

Figure 1:
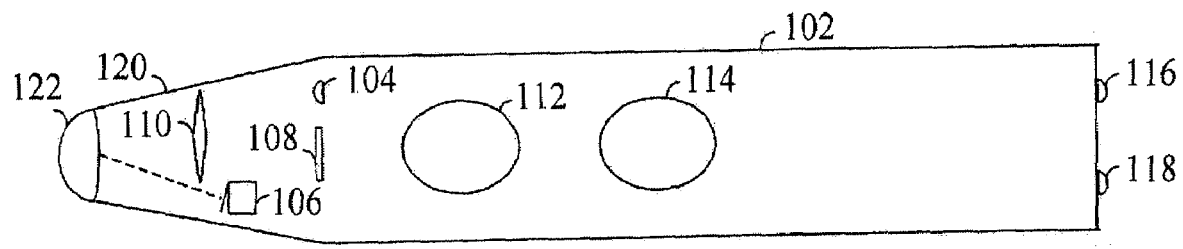
FIG. 1 is a schematic view showing the constitution of a conventional optical mouse device that is embodied as a pen like computer pointing device.
Figure 2:
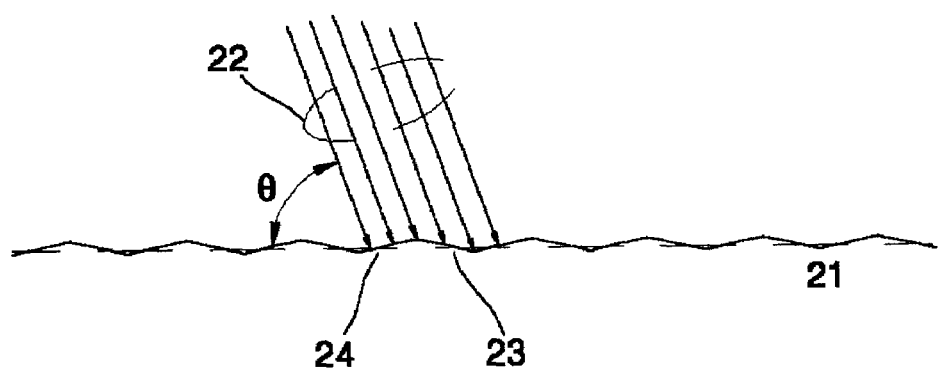
FIG. 2 shows a state where light emitted from an illumination unit of the conventional optical mouse device is incident on a work surface.
Figure 10:
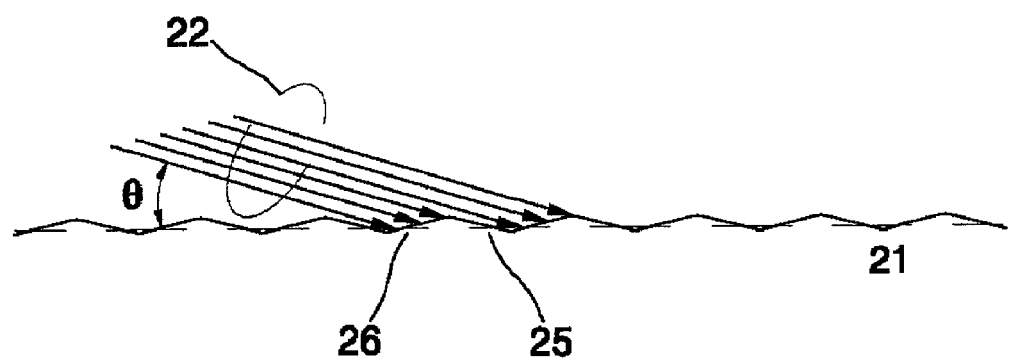
FIG. 10 is a detailed state where light emitted from the illumination unit of the pen-type optical mouse device according to the present invention is incident on a work surface.

The reason that the light from the light guide 12 has to be irradiated onto the work surface 20 at a small value will be described with reference to FIG. 10. In the figure, the work surface 21 is a magnified surface having a uniform color and no patterns, such as that of copying paper. When viewing the work surface 21 with the naked eye under normal illumination, the irregularities of such a surface cannot be recognized. However, there are in fact fine irregularities such as those of the work surface 21 shown in FIG. 10. Therefore, contrary to that shown in FIG. 2, if the illuminating angle of the light, which is emitted from the illumination unit 11 and irradiated onto the work surface 21 through the light guide 12, is a small angle (about 10 to 25 degrees), the light can be irradiated onto the left slant surface 26 of a convex portion of the work surface, whereas the light cannot be irradiated onto the right slant surface 25 of the convex portion at all. Thus, when the light is irradiated onto the work surface at the small angle, the left and right slant surfaces of the convex portion are observed as images having brightness different from each other, i.e. images having different patterns, in an image of the work surface captured on the image sensor 14 through the imaging system 13.

Of course, although the illuminating angle of the light emitted from the light guide 12 and then irradiated onto the work surface 21 is influenced by the work surface 21 and intervals between the heights of the irregularities, it is preferably 25 degrees or less in consideration of the intervals and the heights of the irregularities of a general work surface. Meanwhile, if the angle is too small, the efficiency of illumination is deteriorated. Further, if the irregularities do not have a uniform size, lower convex portions of the irregularities are shielded with higher convex portions thereof so that it is difficult to effectively form images of the irregularities. Thus, in this case, the angle is preferably 10 degrees or more.

Next, the reflected light that has been irradiated onto and then reflected by the work surface is incident on the imaging system 13 so as to be imaged.

When the reflected light that has been irradiated onto and then reflected by the work surface passes through the imaging lens 13a of the imaging system 13, as shown in FIG. 5, the path of the reflected light is changed by the reflector or right prism 13b serving as the optical path converter installed slantingly at an angle of 45 degrees in the path of the reflected light, and thus, the light is exactly captured and imaged on a surface of the image sensor 14 attached to a side of the main body of the mouse device. That is, an image plane of the optical system is consistent with the surface of the image sensor.

Of course, the other means in addition to the reflector or right prism 13b may be used as the optical path converter. As shown in FIG. 6, the pentaprism 13c can be used as the optical path converter of the imaging system 13.

In the case where the reflector or right prism 13b shown in FIG. 5 is used as the optical path converter, the left and right portions of the images are changed to the opposite, and the coordinate values of the mouse device are read in a direction opposite to a moving direction of the mouse device. Thus, this should be taken into consideration when calculating the coordinate values. However, in the case where the pentaprism 13c shown in FIG. 6 is used as the optical path converter, the left and right portions of the images are not changed to the opposite. Thus, the coordinate values are calculated in the moving direction of the mouse device. Further, upon use of the pentaprism 13c, the distance between the imaging lens 13a and the pentaprism 13c can be reduced, thereby achieving miniaturization of the pen-type optical mouse device.

Moreover, the distance between the work surface 21 and the imaging lens 13a should be nearly same as the distance between the imaging lens 13a and the image sensor 14 so that the magnification of the imaging system 13 becomes a value close to 1. The distance should be set to be twice as long as the focal length of the used imaging lens 13a. If the imaging system 13 is configured such that its magnification is larger or smaller than 1, an actually moved distance of the mouse device becomes different from a moved distance recognized by the image sensor 14 and the control means 15 in view of hardware. Thus, operating accuracy of the mouse device is deteriorated or its operation is inefficiently made. However, in a case where a highly delicate operation should be made using the mouse device, it is necessary to artificially lower its magnification. As for means for artificially adjusting the magnification of the optical system so as to utilize such an advantage, a zoom lens may be used, or an auxiliary device for adjusting the optical path length between the work surface and the imaging lens 13a or the distance between the imaging lens 13a and the image sensor 14 may be added.

The imaging lens 13a of the pen-type optical mouse device may be comprised of a general spherical lens made of optical glass, or a plastic injection-molded aspheric lens for miniaturizing the pen-type optical mouse device and reducing its weight. If an aspheric convex lens is used, the diameter of the imaging system 13 can be further reduced so that the mouse device can be slimmed. Further, the mouse device becomes lighter than that employing a glass lens, and thus, a load with which the user's hand is burdened in a manual operation can be alleviated and the operation of the pen-type optical mouse device can be more stably performed. In particular, since the imaging system 13 according to the present invention employs the imaging lens 13a having a focal length longer than that of an imaging lens of a conventional optical mouse device, the depth of focus of the imaging system 13 is increased so that the pen-type optical mouse device can be normally operated on a work surface disposed below a glass sheet and even when it is not in contact with the work surface but located at a position slightly above the work surface.

Figure 11:
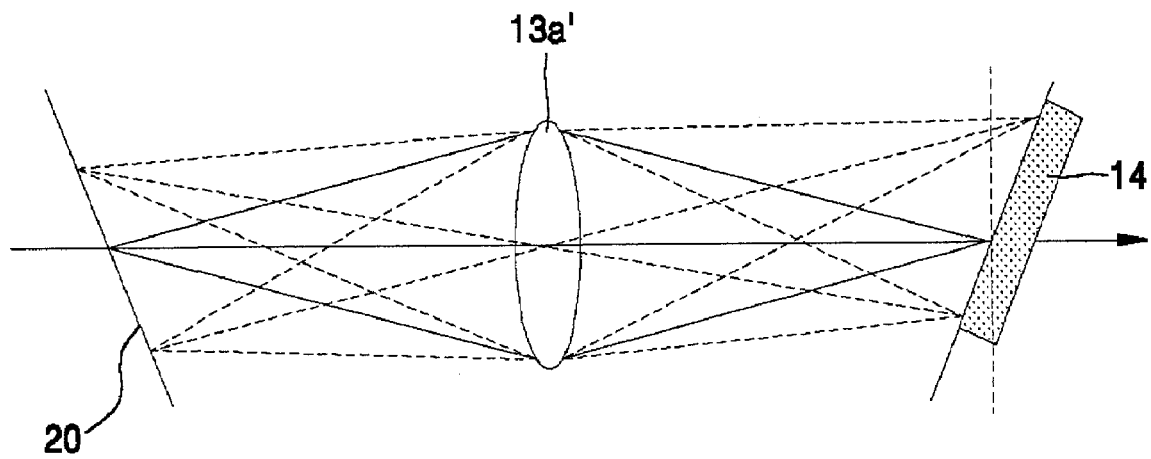
FIG. 11 is a view for explaining a method of correcting trapezoidal distortion by adjusting an arrangement angle of an image sensor of the pen-type optical mouse device according to the present invention.

Since the pen-type optical mouse device is actually used in a slightly inclined state rather than in an upright state, the imaging system 13 may have the trapezoidal distortion. If the trapezoidal distortion is generated, a problem that the moved distance of the mouse device is sensed differently in accordance with the moving direction of the mouse device would be produced, or the operation of the mouse device would be abnormal. Thus, as for the imaging lens 13a, it is preferable to use an imaging lens in which the trapezoidal distortion is minimized. As shown in FIG. 11, when the pen-type optical mouse device is naturally grasped by a user, it is considered that the work surface 20 is inclined relatively to the image sensor 14 as the main body 10 of the mouse device is slanted. When the light reflected by the work surface 20 is received by the image sensor 14 through the imaging lens 13a', the trapezoidal distortion can be minimized by inclining the image sensor 14 in consideration of the degree of the inclination of the work surface 20. That is, a position of the image sensor 14 is adjusted in response to the inclination of the work surface 20. Alternatively, the trapezoidal distortion may be minimized by adjusting a position of the optical path converter 13b, 13c, or the positions of the image sensor 14 and the optical path converter.

Then, the image sensor 14 converts the image of the work surface formed by the imaging system 13 including the imaging lens 13a and the optical path converter into electrical signals that in turn are transmitted to the control means 15.

The image sensor 14 can be installed on a side of the interior of the main body owing to the optical path converter of the imaging system 13 for changing the path of the converging light by 90 degrees, as shown in FIG. 5 or 6. Therefore, even though the width of the image sensor 14 is larger than the diameter of the mouse device, it can be installed at any position of the interior of the main body so that the pen-type optical mouse device can be slimmed.

The control means 15 calculates the movement of the mouse device, i.e. x- and y-coordinate values changed according to the moving direction and distance of the mouse device, and then transmits the calculated coordinate values to a computer through the transmitting means 16. At this time, the computer causes the position and movement of the cursor to be displayed on a monitor.

Next, the principle that the image sensor 14 and the control means 15 recognize the moving direction and distance of the mouse device in accordance with the movement thereof will be explained below.

Generally, the pen-type optical mouse device sequentially receives the image of the work surface 21 through the imaging system 13 at a rate of about 1,500 pieces per second. The image of the work surface 21 is comprised of 18×18 pixels. If a work surface having a specific pattern (it is not always necessary to be a pattern, and it may be a flaw or a color-changeable portion) is observed by using the mouse device, a specific feature corresponding to the specific pattern exists at a position in the image of the work surface. Thus, as the pen-type optical mouse device is moved, the position of the feature in the image corresponding to the specific pattern, which is observed every time, is moved in proportion to the moving direction and speed of the mouse device. Accordingly, when the moving direction and amount of the feature are determined, the moving direction and distance of the mouse device can be recognized.

Subsequently, the user moves the cursor to a desired position by moving the pen-type optical mouse device and then presses down the set button 17 mounted on the main body so that an icon or program on a screen of the monitor can be selected or executed.

The set button 17 and the wheel switch 18 are operated in the same way as a click unit of a conventional mouse. Therefore, an icon, or a text or letter in a document prepared by a word processor program can be selected by using the set button 17 or the wheel switch 18. For example, when the cursor is placed on a desired icon or the like, execution of a program can be performed, or a function among a menu in a pop-up menu window can be executed, by pressing down the button. Further, the screen of the monitor can be scrolled up and down by using the wheel switch.

Next, a pen-type optical mouse device employing a telecentric system according to the present invention will be explained.

As described above, a writing action with a pen is comprised of a combination of a pen-down action by which the pen is moved while coming into contact with a work surface, and a pen-up action by which the pen is moved while being spaced apart from the work surface. That is, in order to smoothly and naturally input a letter or figure by using the pen-type optical mouse device, such pen-down and pen-up actions should be made in the same way as the pen. Thus, in order to achieve the smooth and natural input of a letter or figure by means of the pen-type optical mouse device, it is required to perform the following steps: the steps of determining the pen-down action or the pen-up action during the writing action, and controlling the mouse device in such a manner that a letter or figure can be drawn while chasing coordinates of the mouse device in accordance with a moving path thereof during the pen-down action and the coordinates can be chased in accordance with the moving path thereof during the pen-up action.

Figure 12:
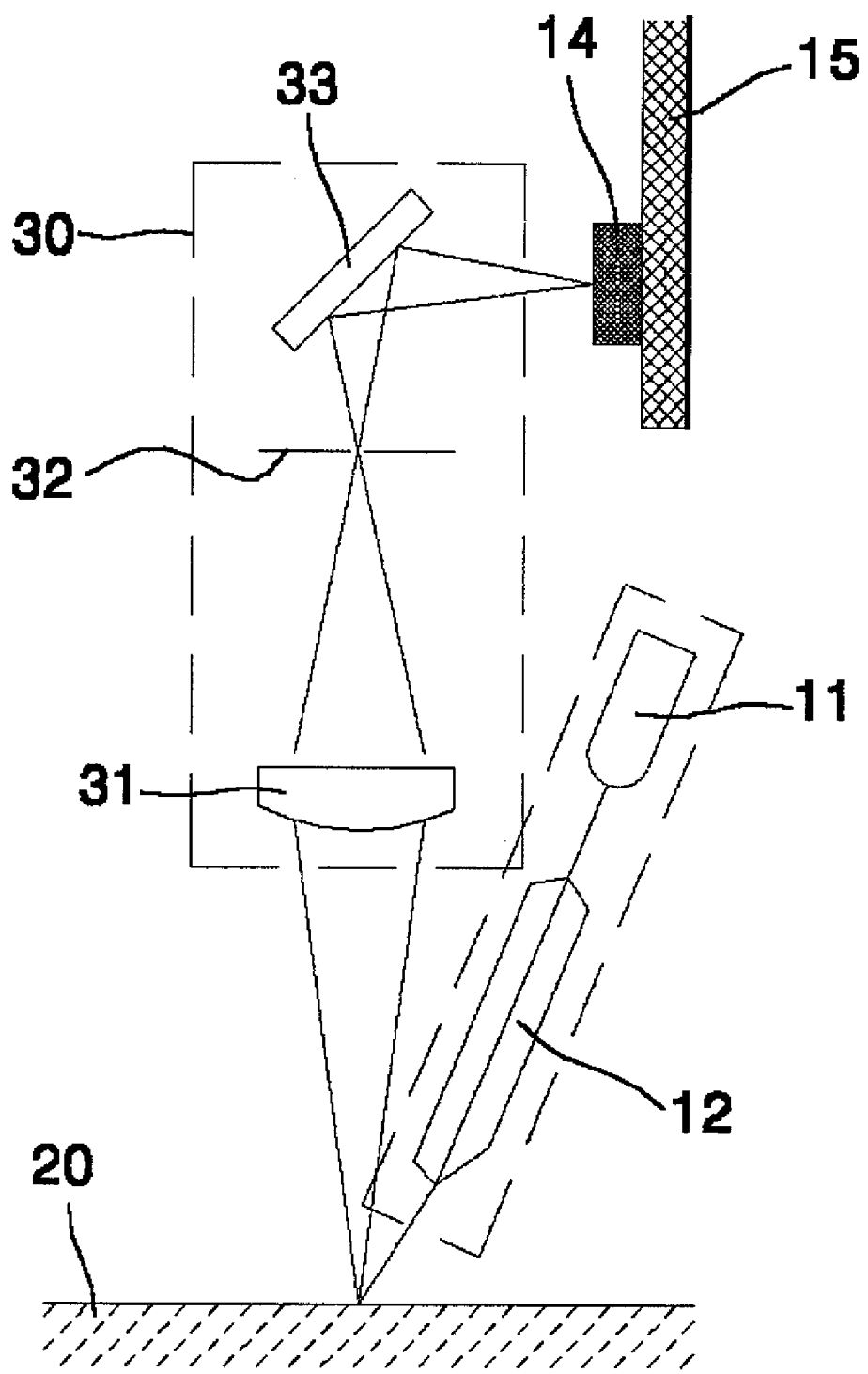
FIG. 12 is a view showing a further example of the inner constitution of the pen-type optical mouse device according to the present invention.

The pen-type optical mouse device according to a further embodiment of the present invention includes the illumination unit 11, the light guide 12, a telecentric system 30, the image sensor 14 and the control means 15, as shown in FIG. 12.

Figure 13:
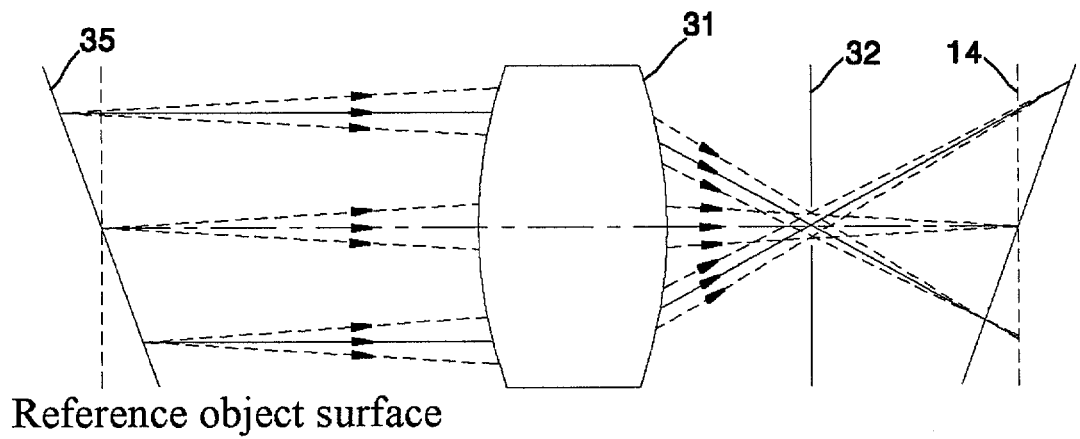
FIG. 13 is a schematic view of a telecentric system employed in the pen-type optical mouse device according to the present invention.

The telecentric system 30 includes a lens 31, a diaphragm 32, and a reflector 33. Light that has passed through the diaphragm 32 is reflected by the reflector 33 and is then received by the image sensor 14. Here, the telecentric system 30 has a long depth of focus, and a magnification of the imaging system is not much influenced by a distance between the pen-type optical mouse device and the work surface. Further, even though the work surface 20 is inclined with respect to the mouse device, the magnification of the telecentric system 30 is kept constant regardless of the distance between a point on the work piece 20 and the lens 31. Thus, it is not necessary to correct an amount of movement of the mouse device sensed by the image sensor 14 according to the inclination angle of the work surface 20. Furthermore, even though an object surface 35 is not perpendicular to an optical axis as shown in FIG. 13, the height of the image measured on the image sensor 14 is proportional to the height of principal rays incident on the lens 31. Thus, the trapezoidal distortion is not much produced. Accordingly, even though the pen-type optical mouse device is inclined with respect to the work surface in use, the occurrence of the trapezoidal distortion can be minimized.

As explained above in detail, however, the trapezoidal distortion can be minimized by arranging the image sensor 14 in response to the inclination of the work surface 20 or the object surface 35. Further, it can be minimized by regulating a position and angle of the optical path converter, e.g., the reflector 33, or by regulating the positions and angles of both the image sensor 14 and the reflector 33.

Figure 14:
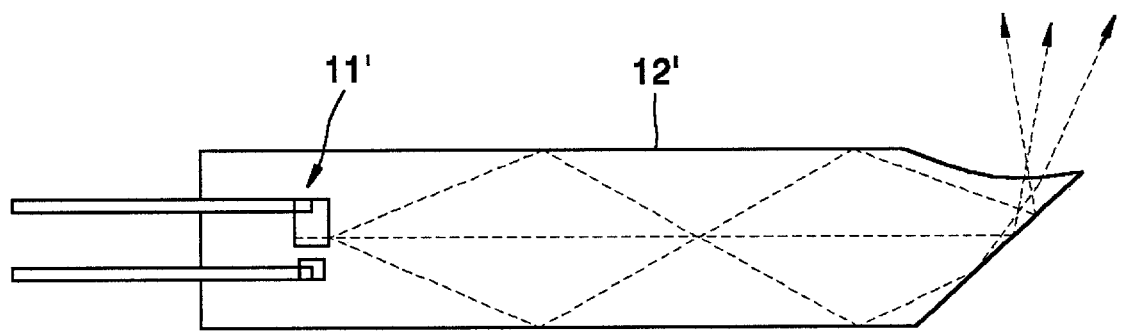
FIG. 14 is a schematic view of the pen-type optical mouse device according to the present invention with the illumination unit and the light guide integrated with each other.

In addition, an interval between the illumination unit 11 and the light guide 12, arrangement angles thereof, or the like is very important in the present invention since it greatly influences the alignment of the imaging system, optical efficiency, and the like. If the optical efficiency is low, the electric power consumption is increased since higher electric power illumination units should be used. Further, a portion of light may enter into the main body of the mouse device directly, and then cause an optical noise to the image sensor due to scattering. Actually, since an illumination unit 11' and a light guide 12' can be integrally formed with each other as shown in FIG. 14, a problem of alignment of the illumination system can be resolved. Further, it can be of help in improving productivity of the mouse device and miniaturizing the optical mouse device.

As described above, by means of an advantage of the long depth of focus of the telecentric system, changes in position of the pen-type optical mouse device according to the present invention can be stably detected regardless of whether the mouse device is moved in contact with the work surface or not. That is, since the pen-type optical mouse device of the present invention allows the image of the work surface to be formed on the image sensor regardless of whether the mouse device is in contact with the work surface, the coordinates of the mouse device can always be correctly measured. Thus, the pen-down and pen-up actions required for the smooth writing action can be performed without any restrictions.

In addition, it is preferred that the pen-type optical mouse device further include an inclination sensor (not shown) for sensing an inclination of a central axis of the pen-type optical mouse device with respect to the direction normal to the work surface, a rotation angle sensor (not shown) for sensing a rotation angle of the pen-type optical mouse device with respect to a reference angle thereof, and an internal memory (not shown) for storing traces of movement of the pen-type optical mouse device when carried with and then utilized by a user.

The pen-type optical mouse device according to the present invention may further include a writing means for actually writing a letter or drawing a figure on a paper sheet while outputting a letter or a figure to the computer monitor.

Figure 15:
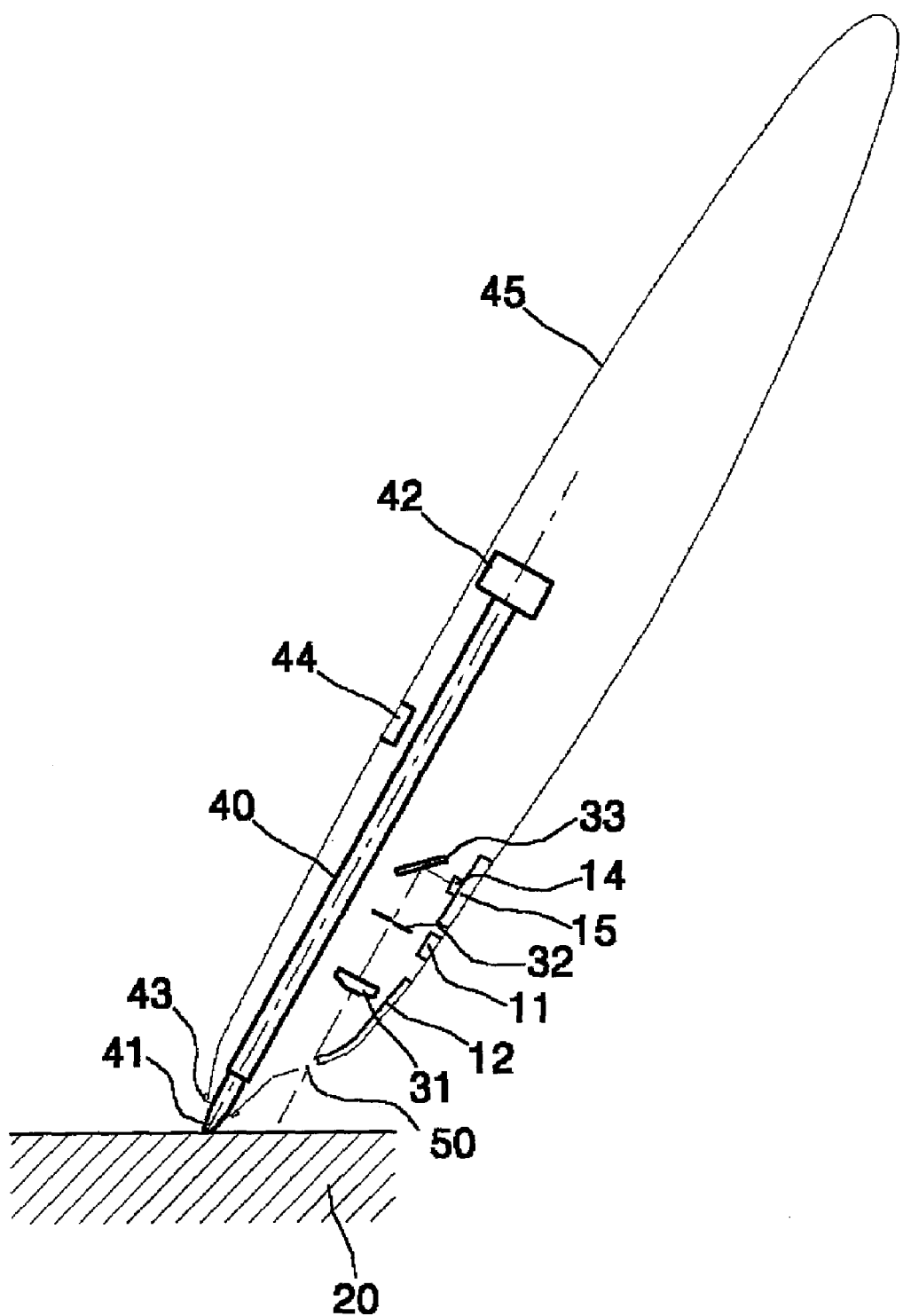
FIG. 15 is a view showing another embodiment of the pen-type optical mouse device according to the present invention.

Referring to FIG. 15, the writing means 40 is provided in a main body 45 of the pen-type optical mouse device according to the present invention and a pressure sensing means 42 is installed at a rear end of the writing means. Here, since the illumination unit 11, the light guide 12, the telecentric system 30, the image sensor 14, etc. perform the same functions as those of the embodiments described above, the detailed descriptions thereof will be omitted. On the other hand, the main body 45 is provided with a hole 50 or transparent window disposed on the optical path such that the light, which is emitted from the illumination unit 11, irradiated onto the work surface 20 and then reflected by the work surface 20, is imaged on the plane of the image sensor 14 through the imaging system 31, 32, 33.

In such a case, since writing operation can be made while actually writing or drawing a letter or figure on the paper sheet by using the writing means 40, the user can input the letter or figure while checking the state where it is actually written onto the sheet without viewing the monitor. In particular, the pen-type optical mouse device in which the writing means is employed can be usefully utilized during a conference or discussion.

Moreover, whether the writing means 40 is in use or not can be selected since the writing means 40 is constructed such that a tip 41 thereof can protrude from or be retracted into the main body 45 by operating a selection key 44. When the writing means 40 is in use, pressure exerted onto the work surface by the writing means is transmitted to the pressure sensing means 42, and thus, the writing input is performed. When the writing means is not in use, since the tip 41 of the writing means has been retracted into the main body 45, the pressure may be transmitted to the pressure sensing means 42 through a pressure transmitting portion 43 installed on a leading end of the main body 45. Alternatively, in order to sense the pressure when the writing means 40 is not in use, an additional contact sensing means (not shown) may be provided at the leading end of the main body 45. Otherwise, a pen point with ink contained therein and a pen point without ink contained therein may be provided, and then, contact sensing means may be provided to both of them, respectively.

Furthermore, the writing means 40 is exchangeable. That is, in a case where the ink contained in the writing means 40 has been used up, only the writing means 40 can be exchanged so that the pen-type optical mouse device is used again.

Figure 16:
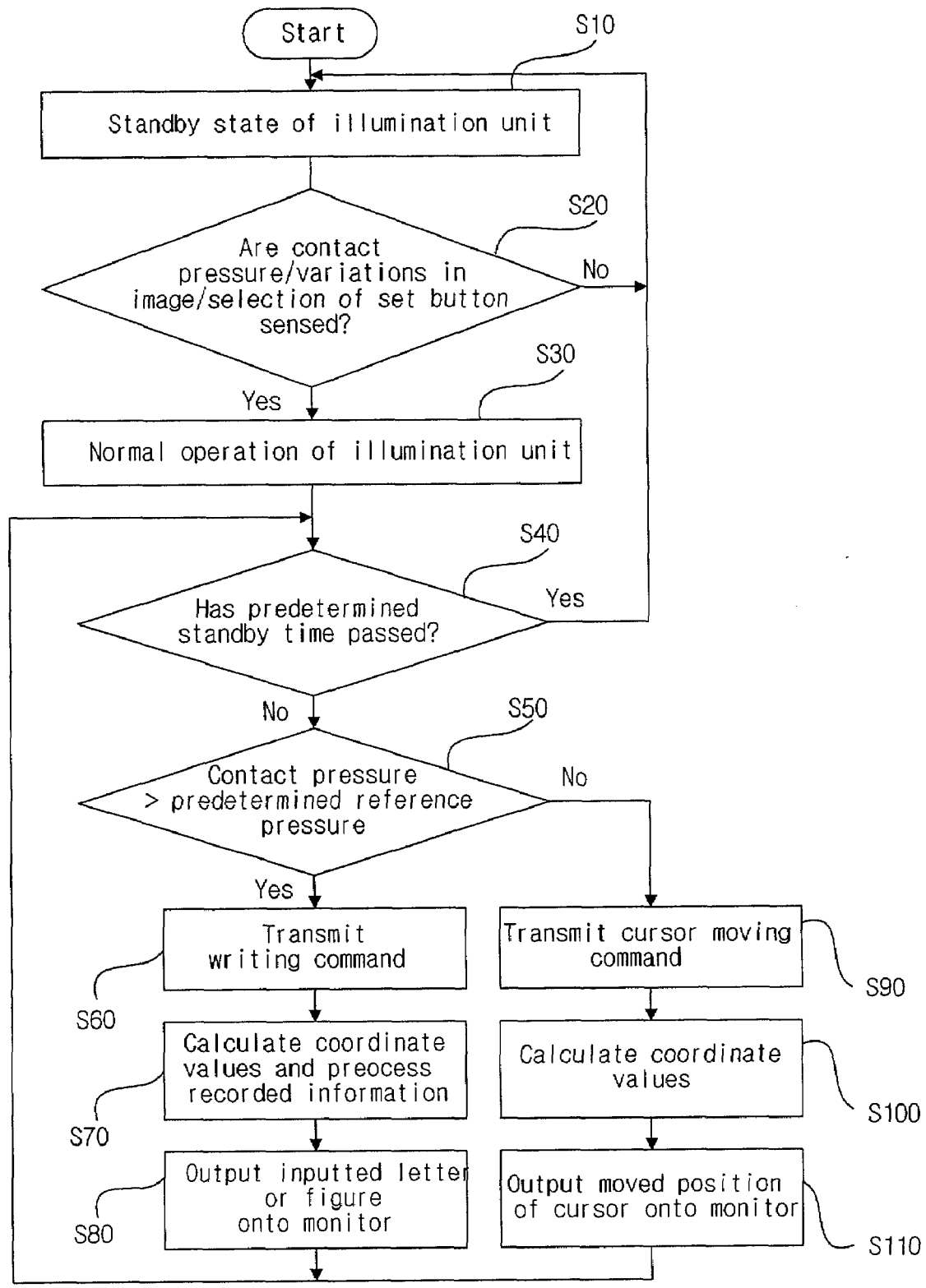
FIG. 16 is a flowchart for explaining a method of controlling the pen-type optical mouse device according to the present invention.

FIG. 16 is a flowchart for explaining a method of controlling the pen-type optical mouse device according to the present invention.

If there is no external light input during a predetermined period of time, the control means 15 causes the illumination unit 11 to emit a minimum luminosity (step S10).

If the user brings the main body 10 of the mouse device into contact with the work surface 20, such as a desk surface, the contact sensing means 19 senses the contact pressure causing the illumination unit 11 to be activated in a normal operating state. If the user moves the main body 10 of the mouse device, the image sensor 14 senses variations in the captured image causing the illumination unit 11 to be activated in the normal operating state. Alternatively, if the user selects either the set button 17 or the wheel switch 18, the illumination unit 11 is activated in the normal operating state (steps S20~S30).

Furthermore, it is checked as to whether a predetermined standby time has passed. If there is no any external input such as light level, variations in the captured image, and the contact pressure within the predetermined standby time, the control means 15 causes the illumination unit 11 to emit the minimum luminosity (step S40).

If the contact sensing means 19 has sensed the contact pressure, its magnitude P is checked as to whether it is greater than that of a predetermined reference pressure P0 (step S50). The predetermined reference pressure P0 is the minimum pressure which should be exerted on the work surface 20 when the user generally performs the writing action. That is, when the optical mouse device comes into contact with the work surface 20 with a pressure smaller than the reference pressure P0 or is spaced apart from the work surface 20, it is not recognized as the writing command. Thus, when the mouse device is moved under this condition, the cursor is merely moved. Therefore, when the user intends to move the cursor without performing the writing action, it is possible to move the mouse device in a state where the mouse device is in weak contact with the work surface 20. Further, if the reference pressure P0 is set at zero, the writing command can be recognized whenever the pen-type optical mouse device comes into contact with the work surface regardless of the magnitude of the contact pressure. Thus, the writing input can be made in the same manner as when an actual writing action is made regardless of a difference in grasping power which may be produced when an individual grips the mouse device.

If the magnitude of the sensed contact pressure is greater than that of the predetermined reference pressure, the writing command is transmitted to the control means 15. Simultaneously, the control means 15 calculates the coordinate values of the mouse device according to the movement thereof, then processes information on the inputted letter or figure, and outputs the processed information to the transmitting means 16. Then, the inputted letter or figure is outputted onto the monitor (steps S60~S80). Here, the information on the letter or figure is changed according to the magnitude of the contact pressure sensed by the contact sensing means 19, and thickness of the letter or figure displayed on the monitor is adjusted according to the magnitude of the contact pressure sensed by the contact sensing means 19.

If the magnitude of the sensed contact pressure is smaller than that of the predetermined reference pressure, a cursor moving command is transmitted to the control means 15. Simultaneously, the control means 15 calculates the coordinate values of the mouse device according to the movement thereof and then outputs a moved position of the cursor to the transmitting means 16 so that the moved position of the cursor is outputted onto the monitor (steps S90~S110).

As described above, the contact sensing means 19 serves as a function button for commanding that the writing input is made onto the monitor. That is, according to the present invention, whether the main body 10 of the mouse device comes into contact with the work surface 20 is first sensed. Thereafter, the writing input can be made in the contact state (ON state), whereas the coordinates of the cursor is measured and the cursor is merely moved without performing the writing input in the non-contact state (OFF state). Alternatively, the contact sensing means 19 may be replaced with a general ON-OFF switch.

Figure 3:
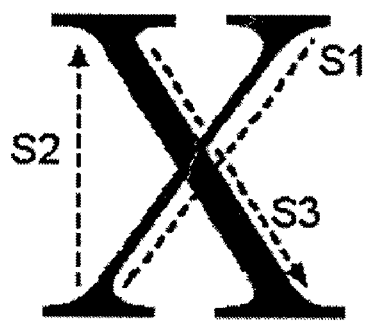
FIG. 3 is a view showing the steps necessary for writing a letter "X"

Next, a case whereby an actual writing input is made using the pen-type optical mouse device according to the present invention will be explained. For example, when the user intends to input the alphabetic capital letter "X," the following steps of writing "/" in the pen-down state (step S1), moving the mouse device in the pen-up state (step S2), and writing "\" in the pen-down state (step S3) should be combined as explained above (refer to FIG. 3). Here, when the mouse device is moved in the pen-down state, the pen-down state of the mouse device is sensed by the contact sensing means 19 since a certain pressure is exerted onto the mouse device by the work surface. In this case, the writing command is automatically recognized and performed.

Further, when the pen is moved in a state where it is spaced apart from the work surface, the pen-up state of the mouse device can be recognized since there is no pressure sensed by the contact sensing means 19. At this time, since there is no writing command, only the chase of the coordinates is performed. According to the pen-type optical mouse device of the present invention, even if the distance between the lens 31 and the work surface 20 is increased somewhat, there is no influence on the imaging of the light, which has been reflected by the work surface 20, onto the image sensor 14 owing to the telecentric system 30 with the long depth of focus. Further, if a lens with a long focal length is employed instead of the telecentric system, the image of the work surface can be sensed by the image sensor 14 in a state where the pen-type optical mouse device is spaced apart from the work surface.

In such a way, since the command for inputting the letter or figure is automatically controlled by whether or not the pen-type optical mouse device exerts a certain pressure on the work surface, the user can cause the letter or figure to be displayed onto the computer monitor as smoothly and naturally as when he/she writes or draws the letter or figure on the sheet as usual.

As described above, according to the pen-type optical mouse device of the present invention, since the pen-down and pen-up actions can be discriminately recognized and the measurement of the coordinates can be made by the telecentric system regardless of whether the mouse device is in contact with the work surface, the writing input can be easily made through a natural writing action.

Figure 17:
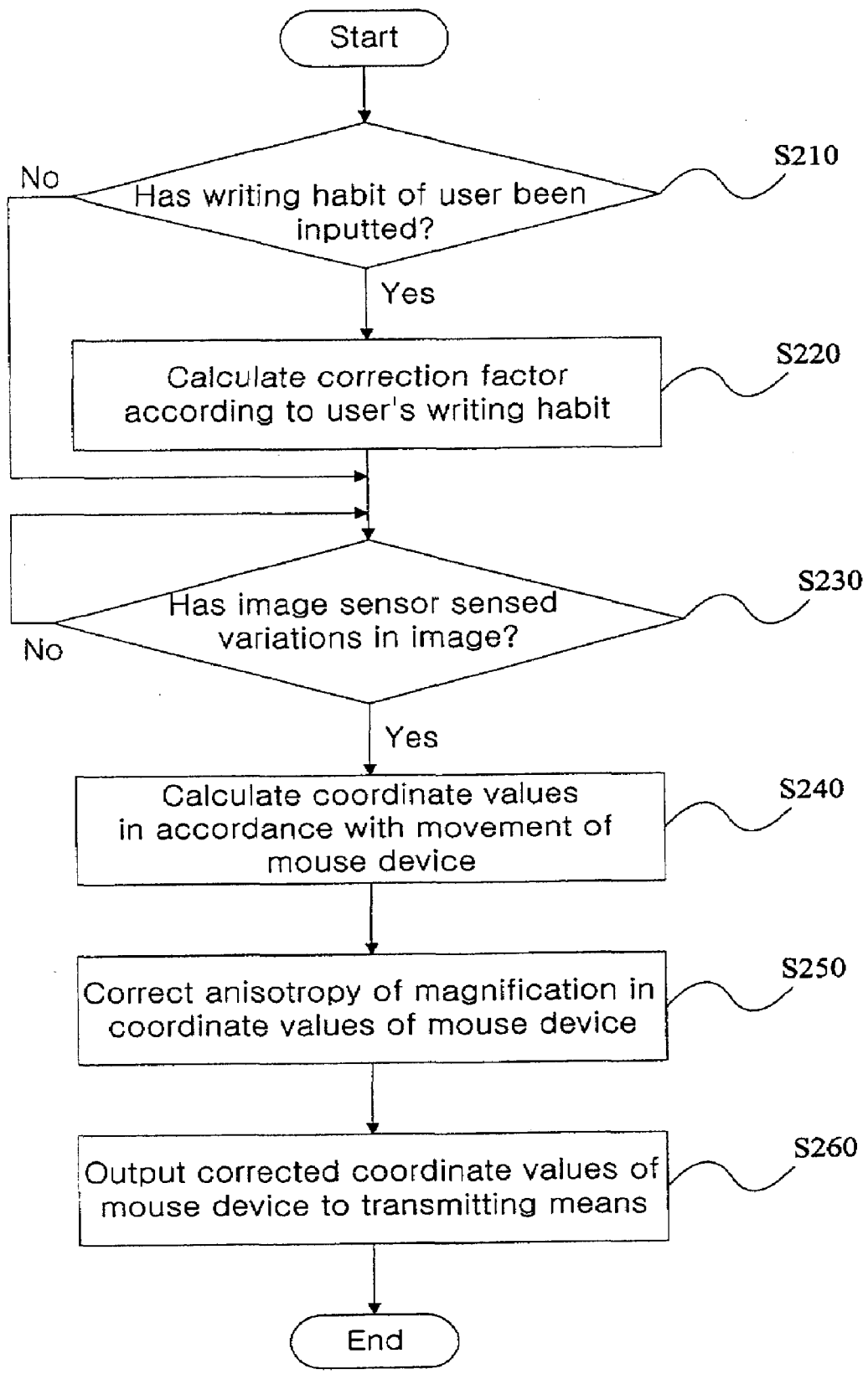
FIG. 17 is a flowchart for explaining a method of correcting the anisotropy of magnification due to the inclination of the pen-type optical mouse device according to the present invention.
Figure 18:
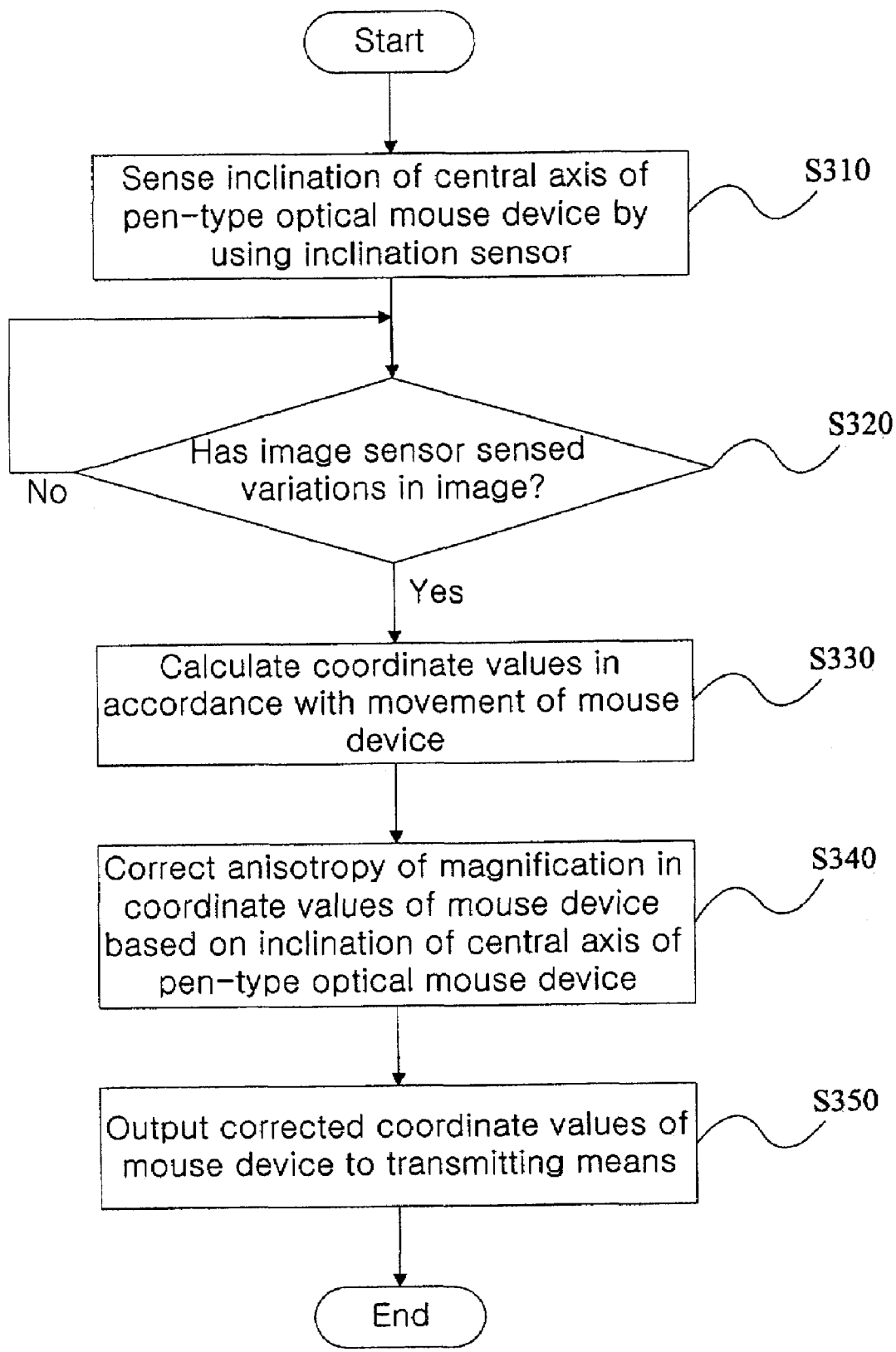
FIG. 18 is a flowchart for explaining another method of correcting the anisotropy of magnification due to the inclination of the pen-type optical mouse device according to the present invention.

FIG. 17 is a flowchart for explaining a method of correcting the anisotropy of magnification due to variations in the inclination of the pen-type optical mouse device, and FIG. 18 is a flowchart for explaining another method of correcting the anisotropy of magnification due to the variations in the inclination of the pen-type optical mouse device. And FIG. 19 is a view for explaining another method of correcting the anisotropy of magnification due to the variations in the inclination of the pen-type optical mouse device.

Figure 19:
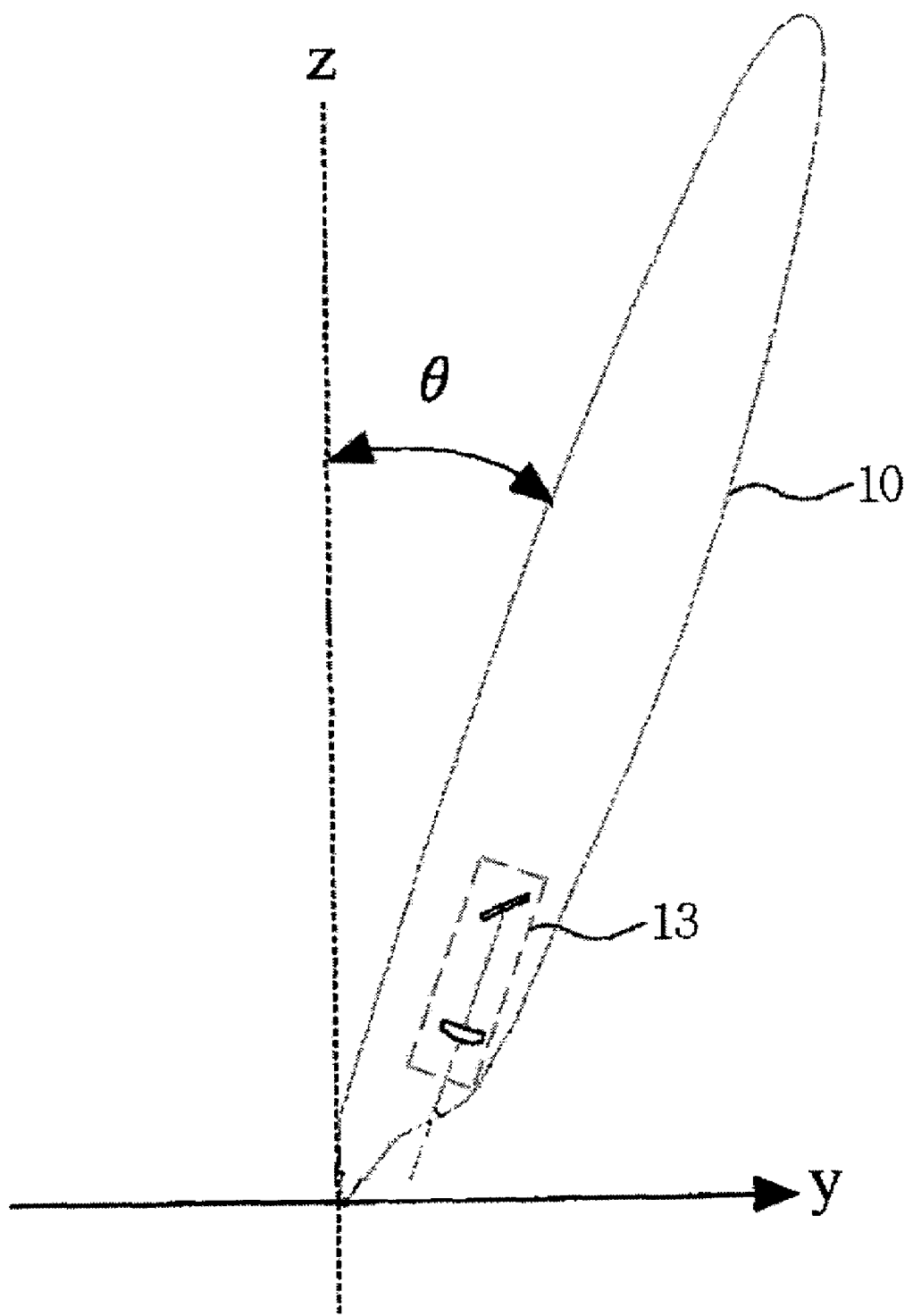
FIG. 19 is a view for explaining another method of correcting the anisotropy of magnification due to the inclination of the pen-type optical mouse device according to the present invention.

As shown in FIG. 19, when the pen-type optical mouse device is used in a state where it is inclined with respect to the work surface, the magnification of the optical mouse device along the x- and y-axes become different from each other. The problems resulted from the anisotropy of magnification can be corrected according to the following procedures.

First, the user checks, through a computer program, whether or not his/her own writing habit has been inputted (step S210). If the user's writing habit has been inputted, correction factor is calculated according to the writing habit inputted by the user (step S220).

More specifically, x- and y-axis oriented straight lines, which are perpendicular to each other and have the same length, are first displayed onto the monitor through the computer program. Then, the user is requested to move the mouse device along the two straight lines. Here, the aforementioned x-, y-, and z-axes are defined as follows. The z-axis is defined as the direction normal to the work surface or sheet surface, and the work surface or sheet surface, i.e. a plane normal to the z-axis, is defined as the x-y plane. Then, the y-axis is defined as a straight line or direction that is simultaneously included in the x-y plane and a plane formed by the normal (z-axis) and the longitudinal axis of the pen-type optical mouse. The x-axis means the direction that is perpendicular to the y-axis and simultaneously placed in the x-y plane.

First, the user is requested to move the mouse device from a start point of a line drawn along the x-axis direction to an end point thereof, and the changes Δx in the x-axis coordinate among the information on the movement of the mouse device transmitted to the computer during the movement thereof are calculated and summed up accumulatively.

$$x_{total} = \Sigma \Delta x$$

The user is then requested to move the mouse device from a start point of a line drawn along the y-axis direction to an end point thereof, and the changes Δy in the y-axis coordinate among the information on the movement of the mouse device transmitted to the computer during the movement thereof are calculated and summed up accumulatively.

$$y_{total} = \Sigma \Delta y$$

Here, if the lengths of the x- and y-axis oriented straight lines drawn on the monitor are the same and the magnification of the pen-type optical mouse device is constant regardless of the direction thereof, the measured $x_{total}$ and $y_{total}$ should be the same value. However, since the pen-type optical mouse device is inclined with respect to the work surface, the values of the $x_{total}$ and $y_{total}$ are different from each other.

Therefore, it is necessary to artificially increase or decrease either the length of the x-axis or y-axis oriented straight lines. If the y-axis oriented length is to be changed to correct the anisotropy of magnification, a correction factor m for the y-axis coordinate should be obtained. Here, the correction factor m is obtained by the following equation (1).

$$m = x_{total}/y_{total} \tag{1}$$

It is then checked as to whether the image sensor 14 has sensed the variations in the image (step S230). If the image sensor 14 has sensed the variations in the image, the coordinate values in accordance with the movement of the mouse device are calculated based on electrical signals converted by the image sensor 14 (step S240).

Based on the calculated correction factor, the anisotropy of magnification in the coordinate values of the mouse device is corrected (step S250). The anisotropy of magnification is corrected by converting the amount of the y-axis directional movement Δy in the calculated coordinate values of the mouse device into a new value $\Delta y_{new}$ by using the calculated correction factor m in accordance with the following equation. Here, $\Delta Y_{new}$ is expressed as the equation (2).

$$\Delta y_{new} = m\Delta y = (x_{total}/y_{total})\Delta y \tag{2}$$

In this embodiment, the step of correcting the anisotropy of magnification (step S250) may also be performed by the control means 15 of the pen-type optical mouse device in addition to the computer program. In such a case, the correction factor m calculated through the computer program is transmitted to the control means 15, which in turn corrects the coordinate values of the mouse device based on the correction factor received from the computer and then outputs the corrected coordinate values to the transmitting means 16 (step S260).

If the user has not yet inputted his/her own writing habit through the computer program, the anisotropy of magnification in the calculated coordinate values of the mouse device is calculated on the basis of a value of the inclination of the central axis of the pen-type optical mouse device that has been predetermined according to a writing habit of a general user. For example, if the inclination of the central axis of the pen-type optical mouse device that has been previously determined according to the writing habit of a general user is θ, the y-axis directional magnification is decreased by cos θ compared with the x-axis directional magnification. Thus, after the anisotropy of magnification is corrected by converting the amount of the y-axis directional movement Δy in the coordinate values of the mouse device calculated by the control means 15 into the value $\Delta y_{new}$ according to the following equation (3), the corrected coordinate values of the mouse device are outputted to the transmitting means 16. Here, the value $\Delta y_{new}$ is expressed as the equation (3).

$$\Delta y_{new} = \Delta y/\cos\theta \tag{3}$$

The problem of the anisotropy of magnification produced when the pen-type optical mouse device is used in a state where it is inclined with respect to the sheet surface can be solved by the aforementioned method. However, it is also possible to solve the problem of the anisotropy of magnification by using the inclination sensor designed for sensing the inclination of the central axis of the pen-type optical mouse device with respect to the normal orthogonal to the work surface, as will be described below.

First, the inclination of the central axis of the pen-type optical mouse device with respect to the normal orthogonal to the work surface is sensed by using the inclination sensor (step S310).

Then, it is checked as to whether the image sensor 14 has sensed the variations in the image (step S320). If the image sensor 14 has sensed the variations in the image, the coordinate values of the mouse device in accordance with the movement thereof are calculated based on the electrical signals converted by the image sensor 14 (step S330).

Based on the calculated inclination θ of the central axis of the pen-type optical mouse device sensed by the inclination sensor, the anisotropy of magnification in the calculated coordinate values of the mouse device is corrected (step S340). After the anisotropy of magnification is corrected by converting the changes Δy of the y-axis coordinate in the coordinate values of the mouse device into the value $\Delta y_{new}$, according to the following equation (3), the corrected coordinate values of the mouse device are outputted to the transmitting means (step S350).

In this embodiment, the step of correcting the anisotropy of magnification (step S340) may also be performed by a computer program in addition to the control means 15 of the pen-type optical mouse device. In such a case, the computer program corrects the coordinate values of the mouse device based on the inclination of the mouse device received from the mouse device. At this time, the step of outputting the corrected coordinate values of the mouse device to the transmitting means 16 (step S350) is omitted, Further, when the pen-type optical mouse device is used in a state where it is inclined with respect to sheet surface, the image is not likely to be correctly imaged by the imaging lens since the distance between the work surface and the imaging lens is changed. In order to minimize an image blur resulting from the aforementioned, the imaging system should allow a portion of the work surface close to the central axis of the pen-type optical mouse device to be imaged. That is, the optical axis of the imaging system should be inclined by a predetermined angle with respect to the central axis of the pen-type optical mouse device so that the imaging system with a finite diameter allows the portion of the work surface close to the central axis of the pen-type optical mouse device to be imaged. Therefore, in the pen-type optical mouse device of the present invention, the image blur resulted from the variations in the inclination of the mouse device can be minimized by arranging the imaging system in such a manner that the optical axis thereof is inclined by a predetermined angle (about 6 degrees) with respect to the central axis of the pen-type optical mouse device.

Figure 20:
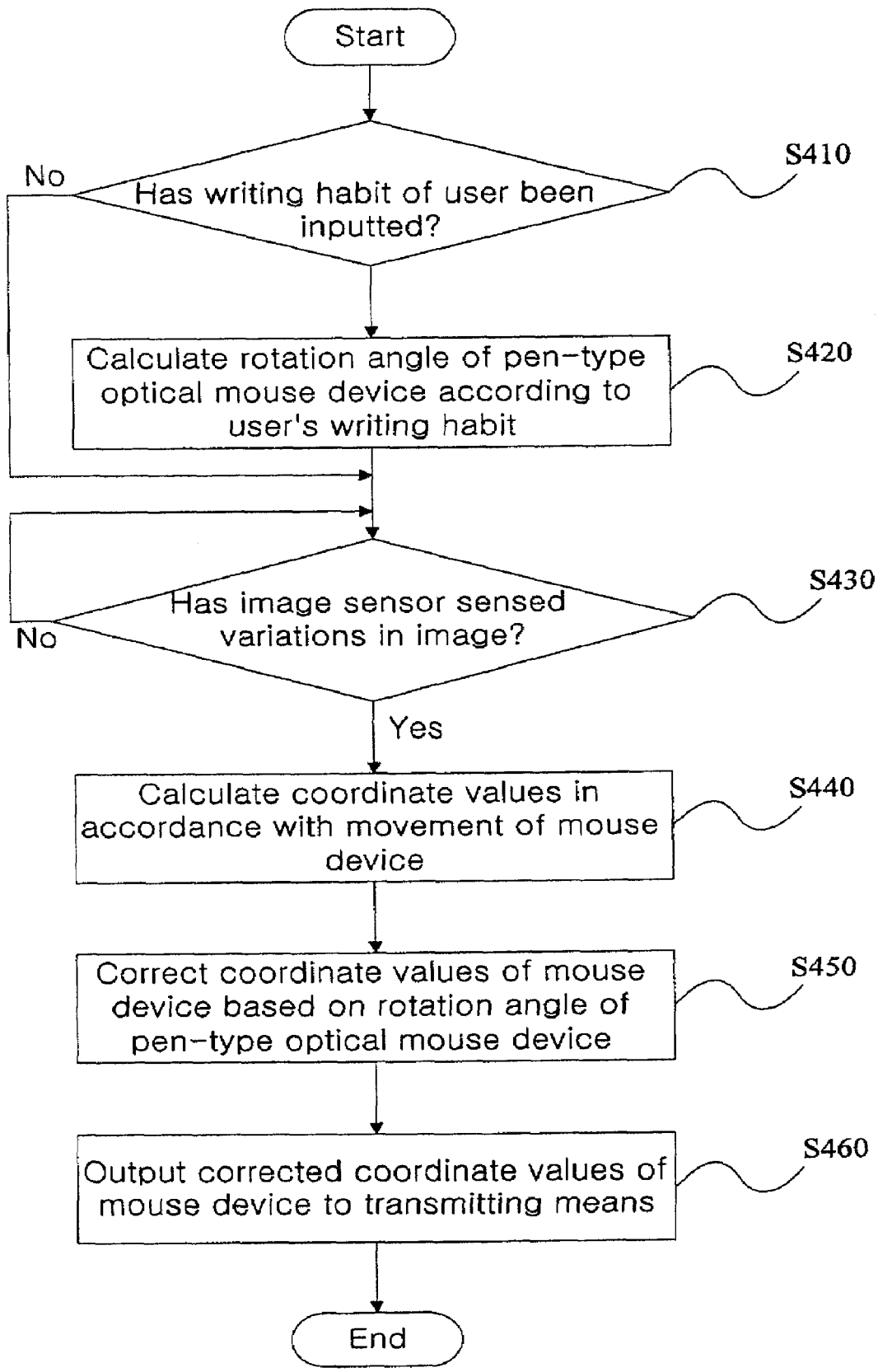
FIG. 20 is a flowchart for explaining a method of correcting distortion due to an individual difference in a grasping posture of the pen-type optical mouse device according to the present invention.
Figure 21:
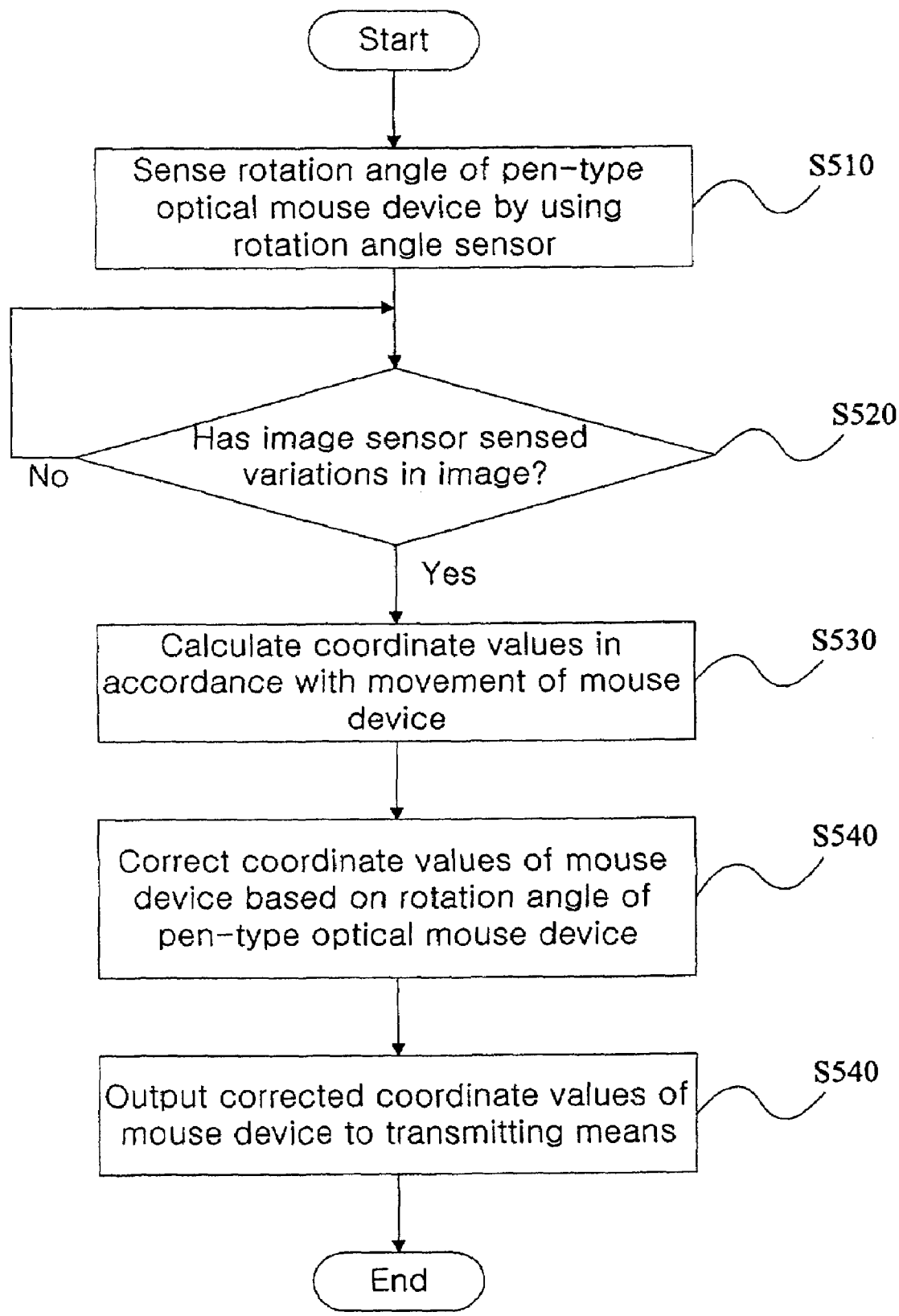
FIG. 21 is a flowchart for explaining another method of correcting the distortion due to an individual difference in the grasping posture of the pen-type optical mouse device according to the present invention.
Figure 22:
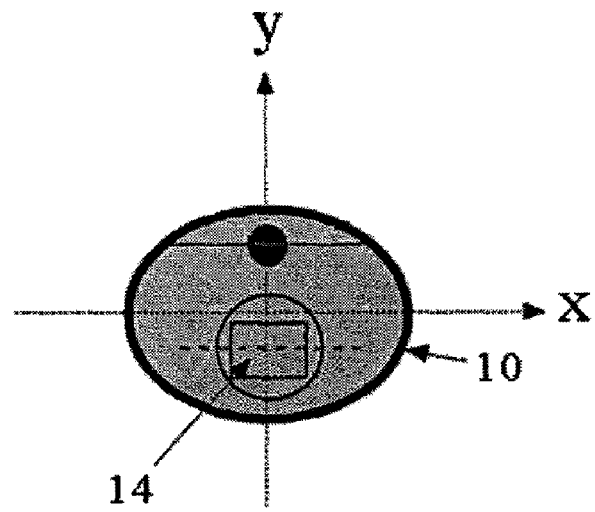
FIG. 22 is a view for explaining the method of correcting the distortion due to an individual difference in the grasping posture of the pen-type optical mouse device according to the present invention.
Figure 22:
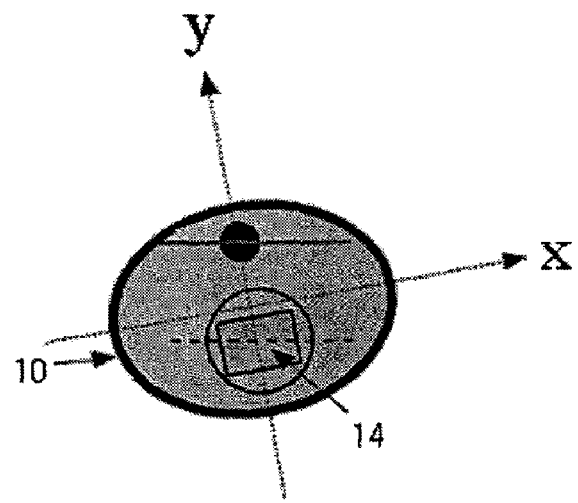
Figure 23:
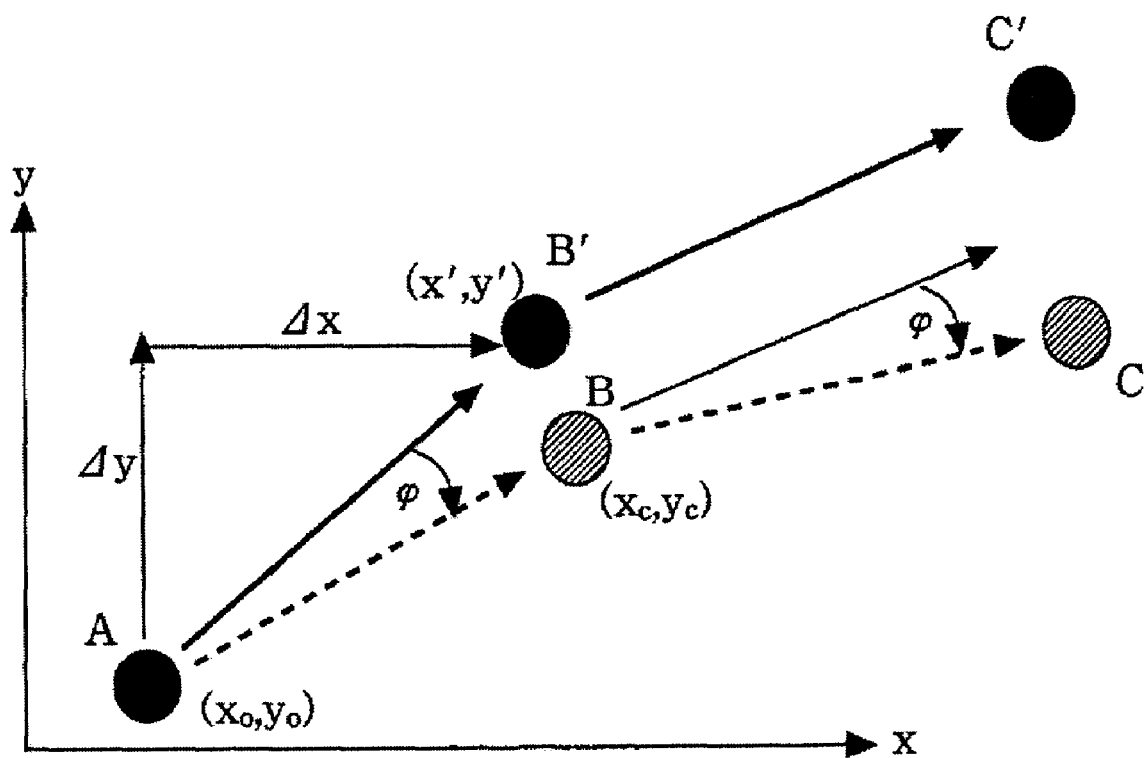
FIG. 23 is another view for explaining the method of correcting the distortion due to an individual difference in the grasping posture of the pen-type optical mouse device according to the present invention.

FIG. 20 is a flowchart for explaining a method of correcting distortion due to an individual difference in grasping postures of the pen-type optical mouse device according to the present invention, FIG. 21 is a flowchart for explaining another method of correcting the distortion due to an individual difference in the grasping postures of the pen-type optical mouse device according to the present invention, and FIGS. 22 and 23 are views for explaining the methods of correcting the distortion due to an individual difference in the grasping postures of the pen-type optical mouse device according to the present invention.

FIG. 22(a) is a sectional view of the pen-type optical mouse device in a case where the pen-type optical mouse device is grasped normally and FIG. 22(b) is a sectional view of the pen-type optical mouse device in a case where the pen-type optical mouse device is grasped abnormally. As shown in FIG. 22(a), in a case where the pen-type optical mouse device is grasped normally, the moving direction (dotted line) of the mouse device recognized by the image sensor 14 is parallel to a central axis (x-axis in the figure) in the cross-section of the pen-type optical mouse device. Thus, the actual moving direction (solid line) of the mouse device coincides with the moving direction (dotted line) of the mouse device recognized by the image sensor 14.

However, as shown in FIG. 22(b), in the case where the pen-type optical mouse device is abnormally grasped, the moving direction (dotted line) of the mouse device recognized by the image sensor 14 deviates by a predetermined angle from the central axis (x-axis in the figure) of the cross-section of the pen-type optical mouse device. As a result, the moving direction (dotted line) of the mouse device recognized by the image sensor 14 deviates by the predetermined angle from the actual moving direction (solid line) of the mouse device. Thus, the distortion may be produced since the moving direction of the mouse device is erroneously recognized by the deviated angle.

The distortion due to an individual difference in the grasping postures of the pen-type optical mouse device can be corrected by the following method to be described later.

Referring to FIG. 20, it is checked as to whether the user has inputted his/her own writing habit through the computer program (step S410). If the writing habit of the user has been inputted, the rotation angle of the mouse device is calculated with respect to the reference angle thereof based on the writing habit inputted by the user (step S420).

In connection with input of the user's writing habit, the user moves the pen-type optical mouse device along the x-axis direction according to the guide of the computer program so as to draw a horizontal line of a predetermined length onto the monitor screen. At this time, if a grasping position of the pen-type optical mouse device deviates from the reference angle thereof, an oblique line which is inclined by the angle Φ deviated from the reference angle will be drawn onto the monitor screen. Thus, the rotation angle of the mouse device with respect to the reference angle thereof can be easily calculated by obtaining the inclination of the oblique line with respect to the x-axis directional line. Here, the reference angle means the rotation angle of the pen-type optical mouse device existing in a state where the horizontal direction recognized by the image sensor is parallel to the direction along which the pen-type optical mouse device is moved horizontally.

Thereafter, it is checked as to whether or not the image sensor 14 has sensed the variations in the image (step S430). If the image sensor 14 has sensed the variations in the image, the coordinate values in accordance with the movement of the mouse device are calculated based on the electrical signals converted by the image sensor 14 (step S440). Then, the coordinate values of the mouse device are corrected based on the rotation angle of the pen-type optical mouse device with respect to the reference angle thereof (step S450).

Hereinafter, how to correct the coordinate values of the mouse device based on the reference angle of the pen-type optical mouse device will be described in detail.

As shown in FIG. 23, when the pen-type optical mouse device moves from an $A(x_0, y_0)$ point to a $B(x', y')$ point by shifting the values of the coordinates in amounts of Δx and Δy in the x-axis and y-axis directions, respectively, $x'=x_0+\Delta x$ and $y'=y_0+\Delta y$.

If the rotation angle of the pen-type optical mouse device with respect to the reference angle thereof obtained using the computer program is Φ, coordinate values of a new B($x_c$, $y_c$) point obtained by correcting the distortion due to an individual difference in the grasping postures of the pen-type optical mouse device is expressed as the following equation (4).

$$\begin{bmatrix} x_c \\ y_c \end{bmatrix} = \begin{bmatrix} x_o \\ y_o \end{bmatrix} + \begin{bmatrix} \cos\phi & \sin\phi \\ -\sin\phi & \cos\phi \end{bmatrix} \begin{bmatrix} \Delta x' \\ \Delta y' \end{bmatrix} \quad (4)$$

On the other hand, since a relative coordinate system is used in the mouse device, information on a current position of the mouse device is not transmitted to the computer, but the amount of movement of the mouse device from the previous position is transmitted thereto. Therefore, the amounts of movement $\Delta x_c$, $\Delta y_c$ of the mouse device should be obtained from the above equation instead of the corrected coordinate values of the B($x_c$, $y_c$) point.

According to the relationship, $\Delta x_c = x_c - x_0$ and $\Delta y_c = y_c - y_0$, the amounts of movement $\Delta x_c$, $\Delta y_c$ obtained by correcting the distortion due to rotation of the grasping position of the pen-type optical mouse device from the reference angle thereof by the angle Φ are expressed as the following equation (5).

$$\begin{bmatrix} \Delta x_c \\ \Delta y_c \end{bmatrix} = \begin{bmatrix} \cos\phi & \sin\phi \\ -\sin\phi & \cos\phi \end{bmatrix} \begin{bmatrix} \Delta x' \\ \Delta y' \end{bmatrix} \quad (5)$$

Therefore, it is not necessary to set a point just before the movement thereof as a reference point and to store the coordinate values with respect to the reference point. In other words, if only the information on the amount of movement of the pen-type optical mouse device and the current rotation angle with respect to the reference angle are given, the distortion of the coordinate values of the pen-type optical mouse device due to an individual difference in the grasping postures thereof can be corrected through the above equation.

In this embodiment, the step of correcting the coordinate values of the mouse device (step S450) may also be performed by the control means 15 of the pen-type optical mouse device in addition to the computer program. In such a case, the rotation angle of the mouse device calculated through the computer program is transmitted to the control means 15, which in turn corrects the coordinate values of the mouse device based on the rotation angle received from the computer and then outputs the corrected coordinate values to the transmitting means 16 (step S460).

The distortion of the coordinate values of the pen-type optical mouse device due to an individual difference in the grasping postures thereof can be corrected according to the above method. However, it is also possible to correct the distortion of the coordinate values of the pen-type optical mouse device due to the changes in the grasping postures thereof using the rotation angle sensor for sensing the rotation angle of the mouse device with respect to the reference angle thereof, as described below.

Referring to FIG. 21, the rotation angle of the pen-type optical mouse device with respect to the reference angle thereof is first sensed by the rotation angle sensor (step S510) which operates on the same principle as the inclination sensor except that a central axis thereof is different from that of the inclination sensor.

Thereafter, it is checked as to whether the image sensor has sensed the variations in the image (step S520). If the image sensor has sensed the variations in the image, the coordinate values in accordance with the movement of the mouse device are calculated based on the electrical signals converted by the image sensor (step S530). Then, the calculated coordinate values of the mouse device are corrected based on the rotation angle of the mouse device sensed by the rotation angle sensor with respect to the reference angle thereof, and the corrected coordinate values thereof are outputted to the transmitting means (steps S540~S550). At this point, since the procedures of correcting the coordinate values of the pen-type optical mouse device based on the rotation angle of the mouse device sensed by the rotation angle sensor are the same as those of the foregoing, the description thereof will be omitted.

In this embodiment, the step of correcting the coordinate values of the mouse device (step S540) may also be performed by a computer program in addition to the control means 15 of the pen-type optical mouse device. In such a case, the computer program corrects the coordinate values of the mouse device based on the rotation angle of the mouse device received from the mouse device. At this time, the step of outputting the corrected coordinate values of the mouse device to the transmitting means 16 (step S550) is omitted.

The pen-type optical mouse device and method of controlling the same according to the present invention have the following effects.

Firstly, since the light emitted from the light emitting means through the light guide is irradiated onto the work surface at a small angle therewith and is not diffused to the surroundings to increase the amount of reflected light, the pen-type optical mouse device can be operated normally on almost all work surfaces. Further, the pen-type optical mouse device can be operated without an additional mouse pad.

Secondly, since the path of the converging reflected light is changed by 90 degrees through the optical path converter so that the image sensor is installed on a side of the interior of the main body of the pen-type optical mouse device, the pen-type optical mouse device can be manufactured to have a diameter slightly larger than that of the lens regardless of the size of the image sensor. Thus, the pen-type optical mouse device can be constructed to be slim enough to allow the user to easily grasp it.

Thirdly, since a zoom lens can be used instead of the simple imaging lens, or the function of adjusting the arrangement of the imaging system can be added, the operating accuracy of the mouse device can be adjusted and variability of enabling the mouse device to be suitable for high precision operations can be obtained.

Fourthly, since the telecentric system or a lens with a long focal length compared with the diameter thereof is used so as to increase the depth of focus, the pen-down and pen-up actions of the mouse device can be discriminately recognized and the measurement of the coordinates of the mouse device can be made regardless of whether the mouse device is in contact with the work surface. Thus, the writing input can be made through a smooth and natural writing action.

Fifthly, since the arrangement angle(s) of one or both of the optical path converting means and the image sensor is adjusted, or the telecentric system is used, the influence of the trapezoidal distortion on the pen-type optical mouse device is minimized even though the mouse device is inclined with respect to the work surface in use.

Sixthly, since the writing command is automatically recognized with sensing the contact pressure of the mouse device through the contact sensing means, a natural and convenient writing input can be made.

Seventhly, the anisotropy of magnification due to the changes in the inclination of the pen-type optical mouse device and the distortion due to an individual difference in the grasping postures thereof can be corrected. Thus, the accurate movement of the cursor and the exact writing input can be made regardless of the postures in which the user grasps the mouse device.

The present invention is not limited to the aforementioned embodiments thereof, and it will be understood by those skilled in the art that various changes and modifications may be made thereto without departing from the spirit and scope of the invention as defined in the appended claims.

What is claimed is:

1. A method of controlling a pen-type optical mouse device including a mouse main body, an illumination unit, a light guide, an imaging system, an image sensor, a control means, a transmitting means, a set button, and a contact sensing means, comprising the steps of: causing the illumination unit to be on standby so that the illumination unit emits minimal luminosity if there is no input from the exterior for a predetermined period of time; activating the illumination unit to be in a normal operating state if the contact sensing means detects contact pressure, the image sensor detects variations in an image formed thereon, or the set button is selected; checking whether a predetermined standby period of time has passed; if the contact sensing means detects the contact pressure, confirming as to whether the detected contact pressure is higher than a predetermined reference pressure; and if the detected contact pressure is higher than the predetermined reference pressure, transmitting a writing command to the control means, calculating coordinate values in accordance with movement of the mouse device, processing information on the written letter or drawn figure, and outputting the information to the transmitting means.

2. The method of controlling the pen-type optical mouse device as claimed in claim 1, further comprising the step of, if the detected contact pressure is smaller than the predetermined reference pressure, transmitting a cursor moving command to the control means, calculating the coordinate values in accordance with the movement of the mouse device, and outputting the movement of the cursor to the transmitting means.

3. The method of controlling the pen-type optical mouse device as claimed in claim 1, wherein the information on the letter or figure is changed depending on the magnitude of the contact pressure detected by the contact sensing means.

4. A method of controlling a pen-type optical mouse device including a mouse main body, an illumination unit, a light guide, an imaging system, an image sensor, a control means, a transmitting means, a set button, and a contact sensing means, comprising the steps of: checking whether a user inputs his/her own writing habit through a computer program; if the user's writing habit has been inputted, calculating a correction factor according to the writing habit inputted by the user; checking whether the image sensor detects variations in an image formed thereon; if the image sensor has detected the variations in the image formed thereon, calculating coordinate values in accordance with movement of the mouse device by using electrical signals obtained from the image sensor; correcting the anisotropy of magnification in the coordinate values of the mouse device on the basis of the calculated correction factor; and outputting the corrected coordinate values of the mouse device to the transmitting means.

5. The method of controlling the pen-type optical mouse device as claimed in claim 4, wherein if the user has not inputted his/her own writing habit through the computer program, the anisotropy of magnification in the calculated coordinate values of the mouse device is corrected on the basis of inclination values of a central axis of the mouse device predetermined in accordance with a general user's writing habit.

6. A method of controlling a pen-type optical mouse device including a mouse main body, an illumination unit, a light guide, an imaging system, an image sensor, a control means, a transmitting means, a set button, and an inclination sensor, comprising the steps of: detecting, by the inclination sensor, an inclination of a central axis of the mouse device with respect to the direction normal to a work surface; checking whether the image sensor detects variations in an image formed thereon; if the image sensor has detected the variations in the image formed thereon, calculating coordinate values in accordance with movement of the mouse device by using electrical signals generated obtained from the image sensor; correcting the anisotropy of magnification in the calculated coordinate values of the mouse device on the basis of the inclination of the central axis of the mouse device detected by the inclination sensor; and outputting the corrected coordinate values of the mouse device to the transmitting means.

7. A method of controlling a pen-type optical mouse device including a mouse main body, an illumination unit, a light guide, an imaging system, an image sensor, a control means, a transmitting means, a set button, and a contact sensing means, comprising the steps of: checking whether a user inputs his/her own writing habit through a computer program; if the user's writing habit has been inputted, calculating a rotation angle of the mouse device with respect to a reference angle thereof according to the writing habit inputted by the user; checking whether the image sensor detects variations in an image formed thereon; if the image sensor has detected the variations in the image formed thereon, calculating coordinate values in accordance with movement of the mouse device by using electrical signals obtained from the image sensor; correcting the coordinate values of the mouse device on the basis of the rotation angle of the mouse device with respect to the reference angle thereof; and outputting the corrected coordinate values of the mouse device to the transmitting means.

8. A method of controlling a pen-type optical mouse device including a mouse main body, an illumination unit, a light guide, an imaging system, an image sensor, a control means, a transmitting means, a set button, and a rotation angle sensor, comprising the steps of: detecting, by the rotation angle sensor, a rotation angle of the mouse device with respect to a reference angle thereof; checking whether the image sensor detects variations in an image formed thereon; if the image sensor has detected the variations in the image formed thereon, calculating coordinate values in accordance with movement of the mouse device by using electrical signals obtained form the image ; correcting the calculated coordinate values of the mouse device on the basis of the rotation angle of the mouse device with respect to the reference angle thereof detected by the rotation angle sensor; and outputting the corrected coordinate values of the mouse device to the transmitting means.

* * * * *